(12) United States Patent
Nakamura et al.

(10) Patent No.: US 8,567,579 B2
(45) Date of Patent: Oct. 29, 2013

(54) CLUTCH APPARATUS

(75) Inventors: Shinobu Nakamura, Nagoya (JP);
Masahiro Tomida, Toyoake (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 302 days.

(21) Appl. No.: 12/958,790

(22) Filed: Dec. 2, 2010

(65) Prior Publication Data

US 2011/0139562 A1 Jun. 16, 2011

(30) Foreign Application Priority Data

Dec. 11, 2009 (JP) ................................. 2009-281385

(51) Int. Cl.
*F16H 45/02* (2006.01)
*F16D 25/12* (2006.01)

(52) U.S. Cl.
USPC .......................................... 192/3.25; 192/3.3

(58) Field of Classification Search
USPC ........................................................ 192/3.27
See application file for complete search history.

(56) References Cited

U.S. PATENT DOCUMENTS

| | | | | |
|---|---|---|---|---|
| 4,671,062 A | * | 6/1987 | Ohkubo | 192/3.3 |
| 7,017,722 B2 | * | 3/2006 | Leber | 192/3.27 |
| 2004/0216971 A1 | | 11/2004 | Johann et al. | |
| 2008/0173512 A1 | * | 7/2008 | Kaneko et al. | 192/3.29 |

FOREIGN PATENT DOCUMENTS

| | | |
|---|---|---|
| JP | 2003-028271 A | 1/2003 |
| JP | 2004-301327 A | 10/2004 |

OTHER PUBLICATIONS

Japanese Office Action issued Jul. 9, 2013 by the Japanese Patent Office in Japanese Application No. 2009-281385 and English language translation of Office Action (6 pgs).

* cited by examiner

*Primary Examiner* — Rodney Bonck
(74) *Attorney, Agent, or Firm* — Buchanan Ingersoll & Rooney PC

(57) ABSTRACT

A clutch apparatus includes an input shaft having a bore portion extending in an axial direction thereof, a stator shaft formed in a cylindrical shape and provided so as to surround an outer circumferential surface of the input shaft, and a sleeve formed in a cylindrical shape and provided so as to surround an outer circumferential surface of the stator shaft, wherein the stator shaft includes an internal hydraulic passage, a clearance formed between an inner circumferential surface of the sleeve and the outer circumferential surface of the stator shaft serves as a first hydraulic passage, the internal hydraulic passage serves as a second hydraulic passage, a clearance formed between an inner circumferential surface of the stator shaft and the outer circumferential surface of the input shaft serves as a third hydraulic passage, and the bore portion of the input shaft serves as a fourth hydraulic passage.

19 Claims, 18 Drawing Sheets

CLUTCH APPARATUS

CROSS REFERENCE TO RELATED APPLICATIONS

This application is based on and claims priority under 35 U.S.C. §119 to Japanese Patent Application 2009-281385, filed on Dec. 11, 2009, the entire content of which is incorporated herein by reference.

TECHNICAL FIELD

This disclosure generally relates to a clutch apparatus having multiple hydraulic circuits.

BACKGROUND

Generally, a vehicle having an automatic transmission apparatus is provided with a torque converter, which serves as a clutch apparatus and which is provided on a power transmission path between an internal combustion engine and the transmission apparatus. The torque converter is configured so as to continuously transmit a torque generated by the internal combustion engine while the torque converter is shifted from a stalled state to a directly connected state. There exists a torque converter having a lock-up clutch, which is configured so as to directly connect a pump impeller and a turbine runner in order to absorb a rotational difference between the pump impeller and the turbine runner when the rotational difference therebetween is relatively small, which may result in improving fuel consumption. The torque converter having the lock-up clutch is configured to include three hydraulic circuits. More specifically, the torque converter having the lock-up clutch is provided with a supply hydraulic circuit for supplying oil between the pump impeller and the turbine runner, a release hydraulic circuit for discharging the oil existing between the pump impeller and the turbine runner, and a lock-up clutch actuating hydraulic circuit for supplying the oil in order to actuate the lock-up clutch.

Disclosed in JP2003-028271A is an example of a torque converter (a clutch apparatus) having three hydraulic circuits. The torque converter disclosed in JP2003-028271A is configured so that a first hydraulic circuit (which corresponds to the lock-up clutch actuating hydraulic circuit) includes a hollow portion of a pipe member provided within a hollow portion of an input shaft in a concentric manner, a second hydraulic circuit (which corresponds to the release hydraulic circuit) includes a clearance formed between an outer circumferential portion of the pipe member and an inner circumferential portion of the input shaft, and a third hydraulic circuit (which corresponds to the supply hydraulic circuit) includes a clearance formed between an outer circumferential portion of the input shaft and an inner circumferential portion of a stator shaft facing the outer circumferential portion of the input shaft.

There exists a torque converter that has a lock-up clutch, which has the above-mentioned configuration, and furthermore, a mechanism (an impeller clutch), which is configured so as to disengage a pump impeller from an internal combustion engine, in order to reduce a fluid resistance generated between a turbine runner and the pump impeller, which is aimed to reduce fuel consumption while the internal combustion engine is in an idle state. The converter having the lock-up clutch and the impeller clutch generally needs four hydraulic circuits, more specifically, a supply hydraulic circuit, a release hydraulic circuit, a lock-up clutch actuating hydraulic circuit and an impeller clutch operating hydraulic circuit, which is used to supply oil in order to actuate the impeller clutch.

A configuration of the hydraulic circuits of the torque converter disclosed in JP2003-028271A may be modified as follows in order to include four hydraulic circuits. For example, the first hydraulic circuit (which corresponds to the lock-up clutch actuating hydraulic circuit) may include a hollow portion of a second pipe member, which is provided within the hollow portion of the pipe member in a concentric manner, the second hydraulic circuit (which corresponds to the release hydraulic circuit) may include a clearance formed between an inner circumferential portion of the pipe member, which is provided within the hollow portion of the input shaft in the concentric manner, and an outer circumferential portion of the second pipe member, the third hydraulic circuit (which corresponds to the supply hydraulic circuit) may include a clearance formed between the outer circumferential portion of the pipe member and the inner circumferential portion of the input shaft, and a fourth hydraulic circuit (which corresponds to the impeller clutch actuating hydraulic circuit) may include a clearance formed between the outer circumferential portion of the input shaft and the inner circumferential portion of the stator shaft facing to the outer circumferential portion of the input shaft.

However, according to the torque converter disclosed in JP2003-028271A in which the pipe member is arranged within the hollow portion of the input shaft, a diameter of the input shaft may be accordingly enlarged. Furthermore, as mentioned above, in the case where the torque converter disclosed in JP2003-028271A is modified so as to arrange the second pipe member within the hollow portion of the pipe member in order to form four hydraulic circuits within the torque converter, the diameter of the input shaft is further enlarged.

Still further, in the case where the torque converter disclosed in JP2003-028271A is modified so as to provide the second pipe member within the hollow portion of the pipe member in order to form four hydraulic circuits, additional passage bores need to be formed at the input shaft. The passage bores need to be formed at the input shaft so as to be displaced from each other in an axial direction of the input shaft. Therefore, providing the additional passage bores on the input shaft may result in elongating a length of the input shaft in the axial direction. Furthermore, in the case where the additional passage bores are formed on the input shaft, an additional sealing member needs to be provided between the neighboring passage bores, which may result in further elongating the length of the input shaft in the axial direction.

A need thus exists to provide a clutch apparatus which is not susceptible to the drawback mentioned above.

SUMMARY

According to an aspect of this disclosure, a clutch apparatus includes an input shaft having a bore portion so as to extend from an end portion of the input shaft in an axial direction thereof, a stator shaft formed in a cylindrical shape and provided so as to surround an outer circumferential surface of the input shaft, and a sleeve formed in a cylindrical shape and provided so as to surround an outer circumferential surface of the stator shaft, wherein the stator shaft includes an internal hydraulic passage, a clearance formed between an inner circumferential surface of the sleeve and the outer circumferential surface of the stator shaft serves as a first hydraulic passage, the internal hydraulic passage serves as a second hydraulic passage, a clearance formed between an inner circumferential surface of the stator shaft and the outer circumferential surface of the input shaft serves as a third hydraulic passage, and the bore portion formed at the input shaft serves as a fourth hydraulic passage.

According to another aspect of this disclosure, a clutch apparatus includes an input shaft having a bore portion, a stator shaft formed in a cylindrical shape and provided so as to surround an outer circumferential surface of the input shaft, and a sleeve formed in a cylindrical shape and provided so as to surround an outer circumferential surface of the stator shaft, wherein the stator shaft includes a passage at an inside thereof through which an oil flows, a clearance formed between an inner circumferential surface of the sleeve and the outer circumferential surface of the stator shaft serves as a first hydraulic passage, the passage formed at the inside of the stator shaft serves as a second hydraulic passage, a clearance formed between an inner circumferential surface of the stator shaft and the outer circumferential surface of the input shaft serves as a third hydraulic passage, and the bore portion formed at an inside of the input shaft serves as a fourth hydraulic passage.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Brief Overview

Figure 3:
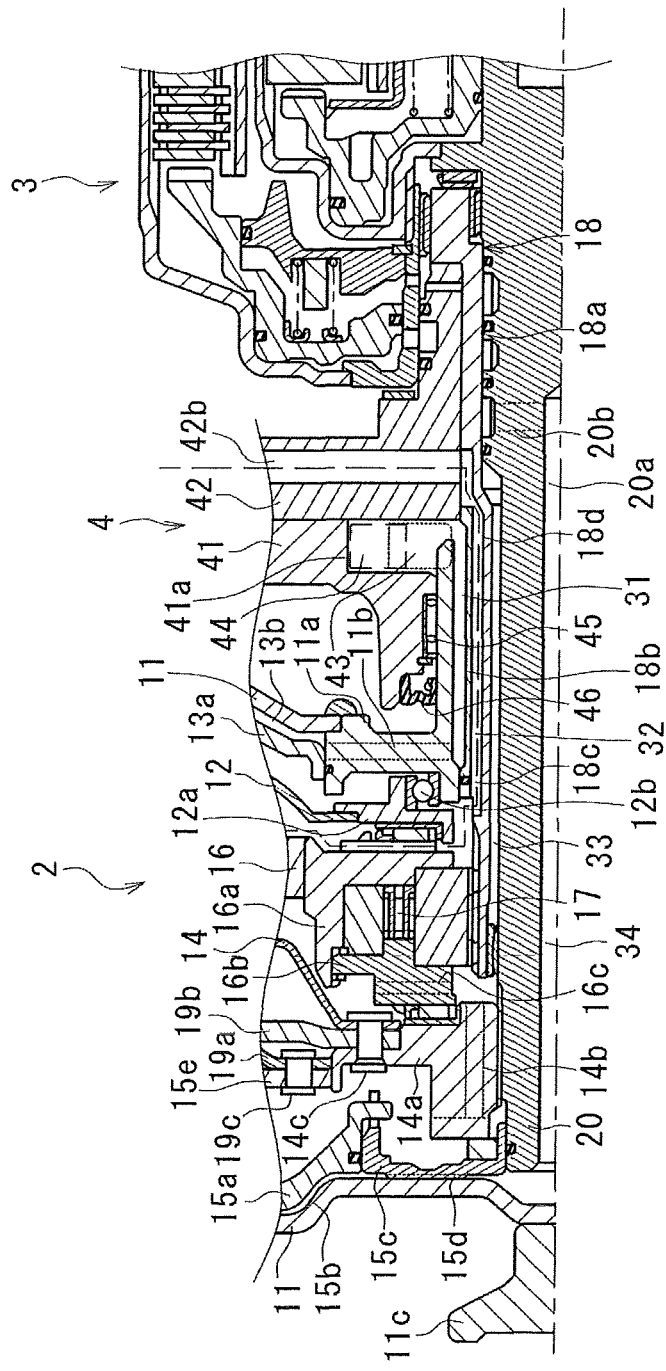
FIG. 3 is a cross-sectional diagram for explaining a supply hydraulic circuit of the clutch apparatus according to the first embodiment.

A clutch apparatus according to embodiments includes an input shaft (20; see FIG. 3) having a bore portion (20a; see FIG. 3) formed so as to extend from an end portion thereof in an axial direction, a stator shaft (18; see FIG. 3), which is formed in a cylindrical shape and is provided so as to surround an outer circumferential portion of the input shaft, and a sleeve (11a; see FIG. 3), which is formed in a cylindrical shape and is provided so as to surround an outer circumferential portion of the stator shaft, wherein the stator shaft includes an internal hydraulic passage (18d; see FIG. 3), a clearance formed between an inner circumferential surface of the sleeve and an outer circumferential surface of the stator shaft serves as a first hydraulic passage (a first hydraulic circuit) (31; see FIG. 3), the internal hydraulic passage serves as a second hydraulic passage (a second hydraulic circuit) (32; see FIG. 3), a clearance formed between an inner circumferential surface of the stator shaft and an outer circumferential surfaces of the input shaft serves as a third hydraulic passage (a third hydraulic circuit) (33; see FIG. 3), and the bore portion of the input shaft serves as a fourth hydraulic passage (a fourth hydraulic circuit) (34; see FIG. 3).

First Embodiment

Figure 1:
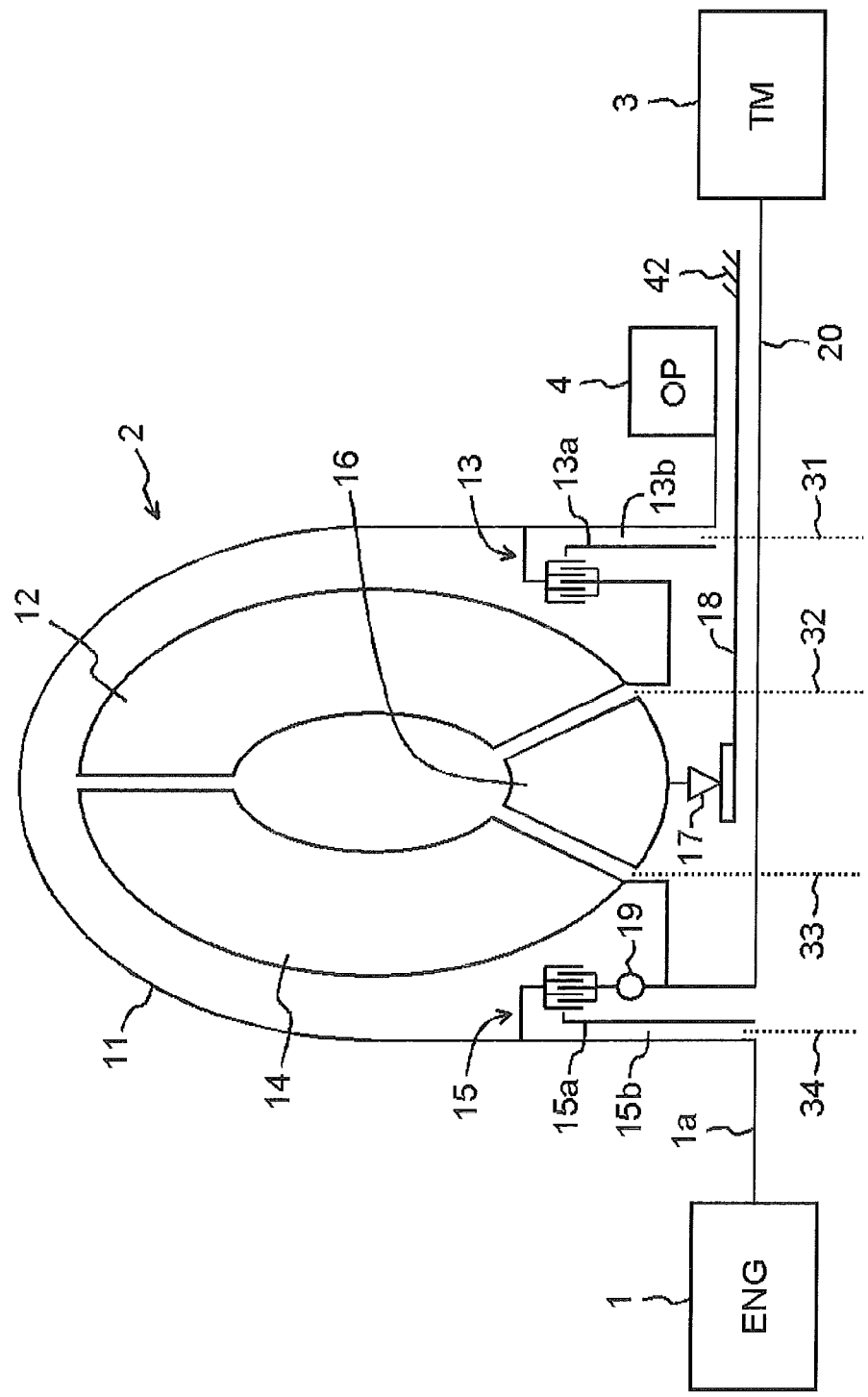
FIG. 1 is a schematic diagram for explaining a hydraulic circuit configuration of a clutch apparatus according to a first embodiment.
Figure 2:
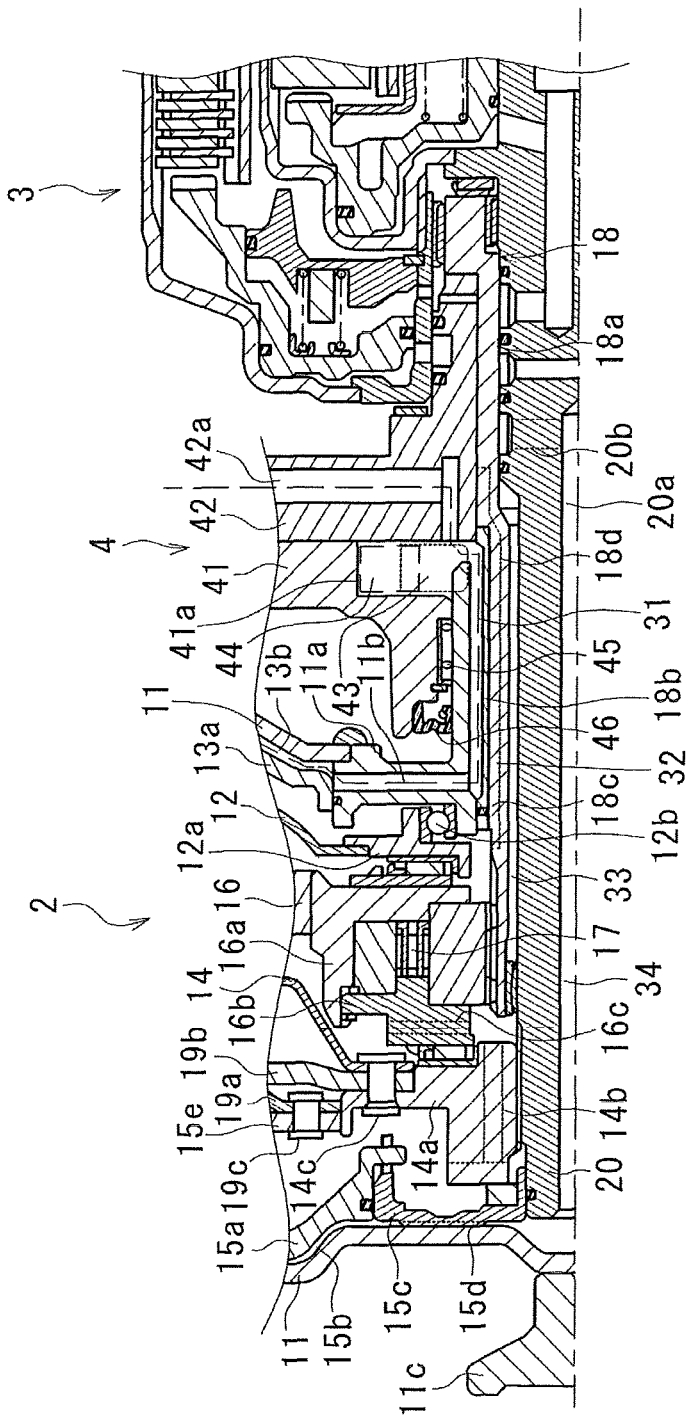
FIG. 2 is a cross-sectional diagram for explaining an impeller clutch actuating hydraulic circuit of the clutch apparatus according to the first embodiment.
Figure 4:
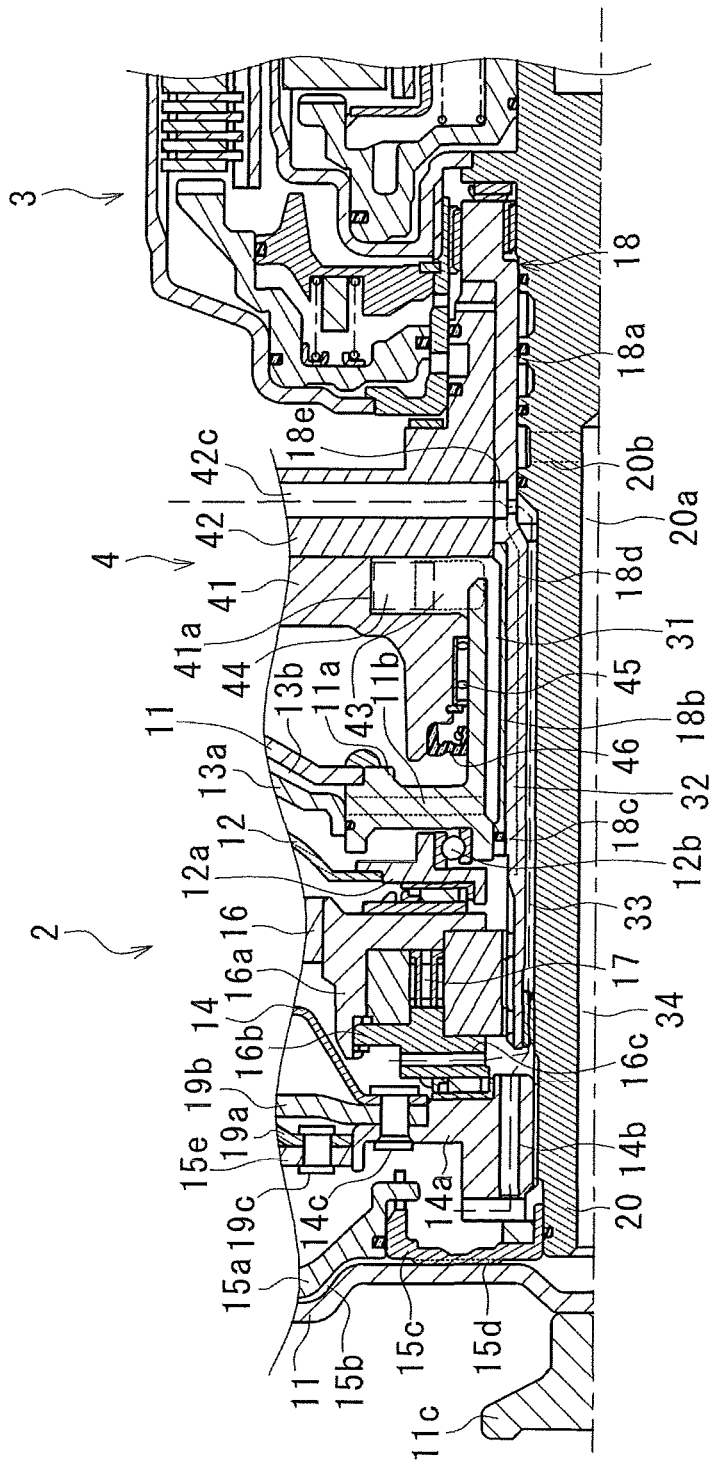
FIG. 4 is a cross-sectional diagram for explaining a release hydraulic circuit of the clutch apparatus according to the first embodiment.
Figure 5:
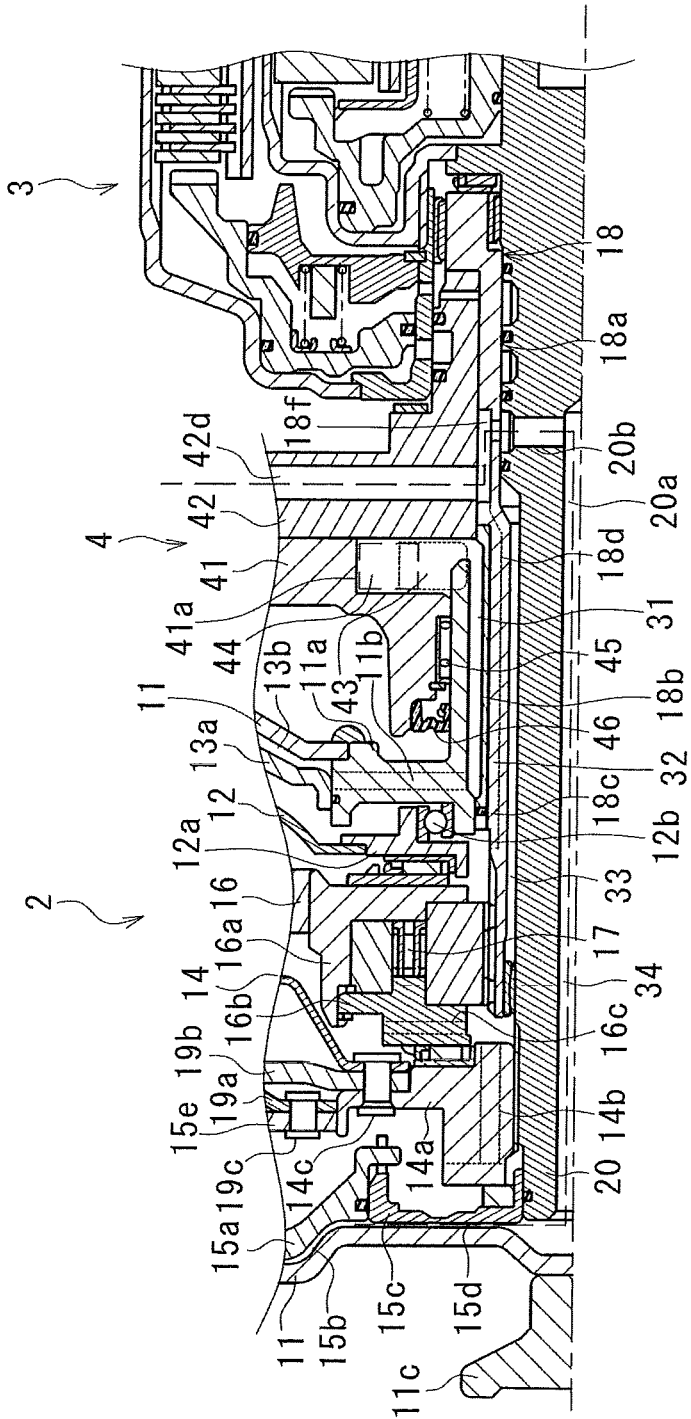
FIG. 5 is a cross-sectional diagram for explaining a lock-up clutch actuating hydraulic circuit of the clutch apparatus according to the first embodiment.

A first embodiment of the clutch apparatus will be described below. Illustrated in FIG. 1 is a schematic diagram for explaining a hydraulic circuit configuration of the clutch apparatus according to the first embodiment. Illustrated in FIG. 2 is a cross-sectional diagram for explaining an impeller clutch actuating hydraulic circuit of the clutch apparatus according to the first embodiment. Illustrated in FIG. 3 is a cross-sectional diagram for explaining a supply hydraulic circuit of the clutch apparatus according to the first embodiment. Illustrated in FIG. 4 is a cross-sectional diagram for explaining a release hydraulic circuit of the clutch apparatus according to the first embodiment. Furthermore, illustrated in FIG. 5 is a cross-sectional diagram for explaining a lock-up clutch actuating hydraulic circuit of the clutch apparatus according to the first embodiment.

As illustrated in FIG. 1, a vehicle includes a torque converter 2, which serves as the clutch apparatus, on a power transmission path between an engine 1 and a transmission apparatus 3. Engagement elements (clutches, brakes and the like) of the torque converter 2 and the transmission apparatus 3 are controlled by means of an electronic control device via hydraulic circuits. An oil pump 4, which is configured so as to suck and discharge oil within an oil pan by using a rotational force generated by the engine 1, is provided between the torque converter 2 and the transmission apparatus 3.

For example, an internal combustion engine (see FIG. 1), which outputs the rotational force from a crankshaft 1a in response to combustion of a fuel (e.g. a hydrocarbonaceous fuel such as gasoline, diesel fuel and the like) is adapted as the engine 1. The rotational force outputted from the engine 1 to the crankshaft 1a is transmitted to a converter shell 11 of the torque converter 2.

The torque converter 2 is a hydraulic transmission apparatus, which is configured so as to amplify (increase) a torque by using hydrodynamic action, more specifically, by using a rotational difference between a pump impeller 12 provided at a force input side of the torque converter 2 and a turbine runner 14 provided at a force output side of the torque converter 2 (see FIG. 1). The torque converter 2 is provided on the power transmission path between the crankshaft 1a and an input shaft 20. Furthermore, the torque converter 2 includes a lock-up clutch 15 and an impeller clutch 13. The lock-up clutch 15 is configured so as to directly connect the turbine runner 14 and the engine 1 in a case where the rotational difference between the pump impeller 12 and the turbine runner 14 is relatively small. The impeller clutch 13 is configured so as to disengage the pump impeller 12 from the engine 1 while the engine 1 is in an idle state. The torque converter 2 further includes an impeller clutch actuating hydraulic circuit 31 (including a first hydraulic passage and a second hydraulic passage) (see FIGS. 1 and 2) for supplying the oil in order to actuate the impeller clutch 13, a supply hydraulic circuit 32 (including the second hydraulic passage and the first hydraulic passage) (see FIGS. 1 and 3) for supplying the oil between the pump impeller 12 and the turbine runner 14, a release hydraulic circuit 33 (including a third hydraulic passage) (see FIGS. 1 and 4) for discharging the oil existing between the pump impeller 12 and the turbine runner 14, and a lock-up clutch actuating hydraulic circuit 34 (including a fourth hydraulic passage) (see FIGS. 1 and 5) for supplying the oil in order to actuate the lock-up clutch 15. The torque converter 2 includes the converter shell 11, the pump impeller 12, the impeller clutch 13, the turbine runner 14, the lock-up clutch 15, a stator 16, a one-way clutch 17, a stator shaft 18, a damper 19 and the input shaft 20 as main components.

The converter shell 11 serves as a casing of the torque converter 2 (see FIG. 1). The converter shell 11 normally rotates together with the crankshaft 1a as a unit. The components of the torque converter 2 and the oil are provided within the converter shell 11, more specifically, within a space formed at inside of the converter shell 11. Furthermore, the converter shell 11 is configured so as to be rotatable relative to the pump impeller 12, and to be rotated together with the pump impeller 12 as a unit in a case where the impeller clutch 13 is in an engaged state. Still further, the converter shell 11 is configured so as to be rotatable relative to the turbine runner 14, and to be rotated together with the turbine runner 14 as a unit in a case where the lock-up clutch 15 is in an engaged state.

The converter shell 11 is connected to a sleeve 11a at an end portion of the converter shell 11 positioned closer to the oil pump 4 by applying a welding and the like at the connected portion between the converter shell 11 and the sleeve 11a, so that the converter shell 11 is rotated together with the sleeve 11a as a unit (see FIGS. 1 to 5). The sleeve 11a is formed in a cylindrical shape and includes a protruding portion, which extends in a radially outward direction thereof from a predetermined portion of an outer circumferential surface of the cylindrical portion and which also continuously extends in a circumferential direction thereof. A radially outer circumferential surface of the protruding portion of the sleeve 11a serves as a slide surface, against which a piston 13a of the impeller clutch 13 slides. Furthermore, the sleeve 11a supports an impeller hub 12a via a bearing 12b at a portion of the outer circumferential surface of the cylinder portion positioned closer to the engine 1 (i.e. positioned at the left in FIGS. 2 to 5) while allowing the impeller hub 12a to be rotatable relative to the sleeve 11a. The sleeve 11a contacts a seal 18c at a portion of an inner circumferential surface thereof positioned closer to the engine 1 (at the left in FIGS. 2 to 5) in order to seal a clearance formed between the inner circumferential surface of the cylinder-shaped sleeve 11a and a cover 18b. A portion of the cylinder-shaped sleeve 11a positioned closer to the transmission apparatus 3 is inserted into a pump body 41, so that the sleeve 11a rotatably supports the pump body 41 via a bush 45. Additionally, a clearance formed between the sleeve 11a and the pump body 41 is sealed by a seal 46 at a position closer to the engine 1 (at the left in FIGS. 2 to 5) relative to the bush 45. An end portion of the cylinder-shaped sleeve 11a positioned closer to the transmission apparatus 3 (i.e. at the right in FIGS. 2 to 5) is engaged with an external gear 43 of the oil pump 4 so as not to be rotatable relative to the oil pump 4 (i.e. so that the sleeve 11a and the oil pump 4 are rotated together as a unit). A clearance (i.e. the first hydraulic passage) formed between the inner circumferential surface of the sleeve 11a and an outer circumferential surface of the cover 18b serves as a portion of the impeller clutch actuating hydraulic circuit 31 (see FIG. 2). The sleeve 11a further includes a hydraulic passage 11b, which connects the clearance formed between the inner circumferential surface of the sleeve 11a and the outer circumferential surface of the cover 18b with an oil chamber 13b of the impeller clutch 13 so as to establish a communication therebetween through the hydraulic passage 11b. The hydraulic passage 11b (the first hydraulic passage) serves as a portion of the impeller clutch actuating hydraulic circuit 31 (see FIG. 2). A center piece 11c is attached on a surface of the converter shell 11 facing the engine 1 so as to be positioned at a center portion of the converter shell 11. The center piece 11c is attached at the converter shell 11 in order to align the converter shell 11 relative to the crankshaft 1a of the engine 1.

The pump impeller 12 discharges the oil towards the turbine runner 14 in response to a rotation of the pump impeller 12 (see FIG. 1). The pump impeller 12 is configured so as to be rotatable relative to the converter shell 11. However, in the case where the impeller clutch 13 is turned to be in the engaged state, the pump impeller 12 is rotated together with the converter shell 11 as the unit.

The pump impeller 12 is fixed on the impeller hub 12a at an inner circumferential end portion of the pump impeller 12, so that the pump impeller 12 is rotated together with the impeller hub 12a as the unit (see FIGS. 1 to 5). The impeller hub 12a is supported by the portion of the outer circumferential surface of the cylinder-shaped sleeve 11a positioned closer to the engine 1 (i.e. at the left in FIGS. 2 to 5) via the bearing 12b while allowing the impeller hub 12a to be rotatable relative to the sleeve 11a. A clearance (the second hydraulic passage) formed between the impeller hub 12a and a first stator support member 16a serves as a portion of the supply hydraulic circuit 32 (see FIG. 3). A spacer, a bush and the like for restricting a relative movement of the impeller hub 12a and the first stator support member 16a in the axial direction of the input shaft 20 are provided at the clearance formed therebetween.

The impeller clutch 13 is a clutch mechanism (a friction engagement element), which is configured so as to disengage the pump impeller 12 from the engine 1 in order to reduce fluid resistance between the turbine runner 14 and the pump impeller 12 and further, in order to reduce fuel consumption while the engine 1 is in the idle state (see FIG. 1). In the case where the impeller clutch 13 is in the engaged state, the impeller clutch 13 transmits the rotational force of the converter shell 11 to the pump impeller 12. The impeller clutch 13 is controlled to be in the engaged state and in a disengaged state by the electronic control device via the impeller clutch actuating hydraulic circuit 31 and other hydraulic circuit(s). Furthermore, in a case where the impeller clutch 13 is configured as a multiple disc clutch as illustrated in FIG. 1, the piston 13*a* presses the multiple disc clutch when a hydraulic pressure is applied to the oil chamber 13*b*, thereby turning the impeller clutch 13 to be in the engaged state. The impeller clutch 13 may be configured as a single disc clutch. In this case, the impeller clutch 13 is turned to be in the disengaged state when the hydraulic pressure is applied to the oil chamber 13*b*.

The impeller clutch 13 includes the piston 13*a*, which is formed in an annular shape and which is slidable against the radially outer circumferential surface of the protruding portion of the sleeve 11*a* (see FIGS. 1 to 5). A clearance formed between the piston 13*a* and the converter shell 11 serves as the oil chamber 13*b*, which is used to actuate the impeller clutch 13. The oil chamber 13*b* is connected to (in communication with) the impeller clutch actuating hydraulic circuit 31 (see FIG. 2).

The turbine runner 14 rotates when receiving the oil discharged from the pump impeller 12 (see FIG. 1). The turbine runner 14 normally rotates together with the input shaft 20 as the unit. Furthermore, the turbine runner 14 is configured so as to be rotatable relative to the converter shell 11, and so as to be rotated together with the converter shell 11 as the unit while the lock-up clutch 15 is in the engaged state.

The turbine runner 14 is connected to a turbine hub 14*a* together with a driven plate 19*b* of the damper 19 by means of a rivet 14*c* (in this embodiment, plural rivets 14*c* are provided), so that the turbine runner 14 is rotated together with the driven plate 19*b* and the turbine hub 14*a* as a unit (see FIGS. 1 to 5). The turbine hub 14*a* supports an inner circumferential end portion of a hub 15*e* of the lock-up clutch 15 and an inner circumferential end portion of a drive plate 19*a* of the damper 19 at an outer circumferential surface of the turbine hub 14*a* while allowing the lock-up clutch 15 and the damper 19 to be rotatable relative to the turbine runner 14. The turbine hub 14*a* is spline-engaged with the input shaft 20 at a radially inner circumferential surface of the turbine hub 14*a*, so that the turbine runner 14 is not rotated relative to the input shaft 20 (i.e. so that the turbine runner 14 and the input shaft 20 are rotated together as a unit). Furthermore, a spacer, a bush or the like is provided in a space formed between the turbine hub 14*a* and a second stator support member 16*b* in order to avoid a relative movement of the turbine hub 14*a* and the second stator support member 16*b* in the axial direction. A spacer, a bush or the like is provided in a space formed between the turbine hub 14*a* and a hub 15*c* in order to avoid a relative movement of the turbine hub 14*a* and the hub 15*c* in the axial direction. The turbine hub 14*a* includes a hydraulic passage 14*b* thorough which the oil leaking from a space between the pump impeller 12 and the turbine runner 14 is discharged towards a hydraulic passage formed between an inner circumferential surface of the stator shaft 18 and the outer circumferential surface of the input shaft 20. The hydraulic passage 14*b* (the third hydraulic passage) serves as a portion of the release hydraulic circuit 33 (see FIG. 4).

The lock-up clutch 15 is a clutch mechanism (a friction engagement element), which is configured so that a rotational difference (i.e. difference in rotational speed) between the engine 1 and the turbine runner 14 is eliminated (so that a rotational speed of the engine 1 corresponds to a rotational speed of the turbine runner 14) by directly connecting the pump impeller 12 and the turbine runner 14 in the case where the rotational difference between the pump impeller 12 and the turbine runner 14 is relatively small (see FIG. 1). The lock-up clutch 15 is configured so as to transmit the rotational force of the converter shell 11 to the turbine runner 14 and the input shaft 20 while the lock-up clutch 15 is in the engaged state. Furthermore, the lock-up clutch 15 is controlled to be in the engaged state and in the disengaged state by the electronic control unit via the lock-up clutch actuating hydraulic circuit 34 and other hydraulic pressure circuit(s). In a case where the lock-up clutch 15 is configured as a multiple disc clutch as illustrated in FIG. 1, a piston 15*a* of the lock-up clutch 15 presses multiple discs in response to a hydraulic pressure applied to an oil chamber 15*b*, thereby turning the lock-up clutch 15 to be in the engaged state. The lock-up clutch 15 may be configured as a single disc clutch. In this case, the lock-up clutch 15 is turned to be in a disengaged state when the hydraulic pressure is applied to the oil chamber 15*b*.

The lock-up clutch 15 includes the piston 15*a*, which is formed in an annular shape and which is slidable against a radially outer circumferential surface of the hub 15*c*, which is fixed on the converter shell 11 (see FIGS. 1 to 5). A clearance formed between the piston 15*a* and the converter shell 11 serves as the oil chamber 15*b*, which is used to actuate the lock-up clutch 15. The oil chamber 15*b* is connected to (in communication with) the lock-up clutch actuating hydraulic circuit 34 (see FIG. 5). The hub 15*c* is fixed on the converter shell 11 by applying a projection welding, a spot welding or the like to a connected portion between the hub 15*c* and the converter shell 11. The hub 15*c* is supported by an end portion of the input shaft 20 positioned closer to the engine 1 at a radially inner circumferential surface of the hub 15*c* while allowing the hub 15*c* to be rotatable relative to the input shaft 20. Furthermore, the hub 15*c* includes a hydraulic passage 15*d*. More specifically, the hydraulic passage 15*d* is formed between the hub 15*c* and the converter shell 11 so as to connect an inlet/outlet port of the first bore portion 20*a* of the input shaft 20 with the oil chamber 15*b* so as to establish a communication therebetween through the hydraulic passage 15*d*. The hydraulic passage 15*d* (the fourth hydraulic passage) serves as a portion of the lock-up clutch actuating hydraulic circuit (see FIG. 5). The lock-up clutch 15 includes the hub 15*e*, which serves as a force transmitting member for transmitting the rotational force from an engaged portion of the clutch towards a driven-side. The hub 15*e* is connected to the drive plate 19*a* of the damper 19 by means of a rivet 19*c* (in this embodiment, plural rivets 19*c* are provided), so that the hub 15*e* is rotated together with the drive plate 19*a* as a unit. A radially inner circumferential end surface of the hub 15*e* is supported by the radially outer circumferential surface of the turbine hub 14*a* while allowing the hub 15*e* to be rotatable relative to the turbine hub 14*a*.

The stator 16 is arranged between the turbine runner 14 and the pump impeller 12 so as to be positioned radially inwardly of the turbine runner 14 and the pump impeller 12 (see FIG. 1). Furthermore, the stator 16 rectifies the oil discharged from the turbine runner 14 and flows back the oil to the pump impeller 12 in order to increase the torque. The stator 16 is fixed on a pump cover 42 via the one-way clutch 17 and the stator shaft 18, so that the stator 16 is allowed to rotate in one direction.

The stator 16 is fixed on the first stator support member 16*a* at a radially inner circumferential end portion of the stator 16

(see FIGS. 1 to 5). The first stator support member 16a is fixed on a hinged end of the one-way clutch 17, so that the first stator support member 16a covers a surface of the one-way clutch 17 facing the transmission apparatus 3. A movement of the first stator support member 16a in the axial direction is restricted by means of the spacer, the bush and the like, which is provided between the first stator support member 16a and the impeller hub 12a. Furthermore, the second stator support member 16b is attached on the first stator support member 16a so that the first stator support member 16a is not rotatable relative to the second stator support member 16b and so as not to be movable relative to the second stator support member 16b in the axial direction by means of a snap pin and the like. The second stator support member 16b covers a surface of the one-way clutch 17 facing the engine 1 (facing the left in FIGS. 2 to 5). A movement of the second stator support member 16b in the axial direction is restricted by means of the spacer, the bush and the like provided between the second stator support member 16b and the turbine hub 14a. Furthermore, the second stator support member 16b includes a hydraulic passage 16c through which the oil existing between the pump impeller 12 and the turbine runner 14 is discharged towards the hydraulic passage formed between the inner circumferential surface of the stator shaft 18 and the outer circumferential surface of the input shaft 20. The hydraulic passage 16c (the third hydraulic passage) serves as a portion of the release hydraulic circuit 33 (see FIG. 4).

The one-way clutch 17 is configured so as to allow the stator 16 to rotate only in the one direction (see FIG. 1). The first stator support member 16a of the stator 16 is fixed on an outer circumferential surface of the hinged end of the one-way clutch 17 (see FIGS. 1 to 5). Furthermore, an inner circumferential surface of the hinged end of the one-way clutch 17 is spline-engaged with a shaft main body 18a of the stator shaft 18 so as not to be rotatable relative to the stator shaft 18.

The stator shaft 18 is a cylinder-shaped member used for fixing a fixed end of the one-way clutch 17 on the pump cover 42 (see FIG. 1). The stator shaft 18 is configured as a unit, in which the cover 18b is press-fitted onto the outer circumferential surface of the stator main body 18a (see FIGS. 1 to 5). Furthermore, the stator shaft 18 includes a hydraulic passage (the second hydraulic passage), which serves as a portion of the supply hydraulic circuit 32.

The shaft main body 18a is arranged so as to surround the outer circumferential surface of the input shaft 20. More specifically, the shaft main body 18a is arranged radially inwardly of an inner circumferential portion of the oil pump 4 and is arranged so that a clearance is formed between the outer circumferential surface of the input shaft 20 and a portion of the shaft main body 18a extending towards the engine 1 (to the left in FIG. 1) from a position corresponding to a stepped portion of the input shaft 20. Furthermore, the shaft main body 18a is supported by the input shaft 20 so as to be rotatable relative to the input shaft 20 by means of a bush, which is provided between the shaft main body 18a and the input shaft 20 at a predetermined position. Still further, a portion of the shaft main body 18a positioned radially inwardly of the inner circumferential portion of the oil pump 4 and extending towards the transmission apparatus 3 from the position corresponding to the stepped portion of the input shaft 20 is supported by the input shaft 20 so as to be rotatable relative to the input shaft 20 via a sealing member(s) (a member for separating the neighboring hydraulic passages so as to be fluid-tightly divided from each other). A portion of the shaft main body 18a also extends into the transmission apparatus 3. A movement of the shaft main body 18a towards one end portion thereof relative to the input shaft 20 in the axial direction is restricted by means of a bush, a spacer and the like while the shaft main body 18a is supported by the input shaft 20 via a bush(es) so as to be rotatable relative to the input shaft 20. The shaft main body 18a supports a certain component(s) of the transmission apparatus 3 via a bush(es) at an outer circumferential surface of the shaft main body 18a while allowing the shaft main body 18a to be rotatable relative to the certain component(s) of the transmission apparatus 3. A portion of the shaft main body 18a and a portion of the cover 18b are press-fitted onto the inner circumferential surface of the pump cover 42 so as to seal a clearance formed therebetween. Furthermore, the shaft main body 18a includes a hydraulic passage 18e, which connects a hydraulic passage 42c of the pump cover 42 with a clearance formed between an inner circumferential surface of the shaft main body 18a and the outer circumferential surface of the input shaft 20 so as to establish a communication therebetween via the hydraulic passage 18e, at a portion of the shaft main body 18a press-fitted onto the inner circumferential surface of the pump cover 42 (see FIG. 4). The hydraulic passage 18e (the third hydraulic passage) serves as a portion of the release hydraulic circuit 33. Furthermore, the shaft main body 18a includes a hydraulic passage 18f, which connects a hydraulic passage 42d of the pump cover 42 with a second bore portion 20b of the input shaft 20 so as to establish a communication therebetween through the hydraulic passage 18f, at a portion which is press-fitted onto the inner circumferential surface of the pump cover 42 (see FIG. 5). The hydraulic passage 18f (the fourth hydraulic passage) serves as a portion of the lock-up clutch actuating hydraulic circuit 34. Still further, a groove portion 18d (an internal hydraulic passage) is formed on the outer circumferential surface of the shaft main body 18a so as to extend from a hydraulic passage 42b of the pump cover 42 towards a vicinity of the impeller hub 12a. The cover 18b, which covers an intermediate portion of the groove portion 18d formed on the outer circumferential surface of the shaft main body 18a, is press-fixed on the shaft many body 18a in a fluid-tight manner. The groove portion 18d (the second hydraulic passage) serves as a portion of the supply hydraulic circuit 32. Furthermore, end portions of the groove portion 18d in the axial direction are not covered by the cover 18b, so that both end portions of the groove portion 18d serve as inlet/outlet ports of the oil, respectively (see FIG. 3). The shaft main body 18a is spline-engaged with the fixed end of the one-way clutch 17 at the vicinity of an end portion of the shaft main body 18a positioned closer to the engine 1 (at the left in FIGS. 1 to 5), so that the shaft main body 18a is not rotated relative to the one-way clutch 17 (i.e. so that the shaft main body 18a and the one-way clutch 17 are rotated together as a unit).

The cover 18b is a cylindrical-shaped member, which covers the intermediate portion of the groove portion 18d formed on the outer circumferential surface of the shaft main body 18a (see FIGS. 1 to 5). The cover 18b is press-fixed on the shaft main body 18 so as to cover the groove portion 18d in the fluid-tight manner. Furthermore, the cover 18b separates the impeller clutch actuating hydraulic circuit 31 and the supply hydraulic circuit 32 (see FIG. 3) (i.e. the cover 18b divides the clearance formed between the inner circumferential surface of the sleeve 11a and the outer circumferential surface (i.e. the groove portion 18d) of the stator shaft 18 into the impeller clutch actuating hydraulic circuit 31 and the supply hydraulic circuit 32). An end portion of the cover 18b positioned closer to the transmission apparatus 3 is press-fixed on the inner circumferential surface of the pump cover 42 together with a portion of the shaft main body 18a in a fluid-tight manner. The sealing member 18c for sealing the clearance formed between the cover 18b and the sleeve 11a is retained by the outer circumferential surface of an end portion of the cover 18b positioned closer to the engine 1. The sealing member 18c separates the impeller clutch actuating hydraulic circuit 31 and the supply hydraulic circuit 32. A clearance (the first hydraulic passage) formed between the outer circumferential surface of the intermediate portion of the cover 18b and the inner circumferential surface of the sleeve 11a serves as the portion of the impeller clutch actuating hydraulic circuit 31 (see FIG. 2).

The damper 19 is a mechanism that is provided on the force transmission path between the lock-up clutch 15 and the input shaft 20 and that absorbs torque fluctuation generated between the input side and the output side by using a spring force (see FIG. 1). The damper 19 includes the drive plate 19a, the driven plate 19b and a coil spring (see FIGS. 1 to 5). The drive plate 19a is connected to the hub 15e of the lock-up clutch 15 by means of a rivet 19c (in this embodiment, plural rivets 19c are provided). The driven plate 19b is connected to the turbine hub 14a together with the turbine runner 14 by means of the rivets 14c. The coil spring absorbs the torque fluctuation generated when the drive plate 19a and the driven plate 19b are rotated relative to each other.

The input shaft 20 transmits the rotational force from the torque converter 2 to the transmission apparatus 3 (see FIG. 1). The input shaft 20 is inserted into the converter shell 11 from a side of the transmission apparatus 3 so that the input shaft 20 is positioned radially inwardly of the converter shell 11 while keeping a clearance between an end surface of the input shaft 20 facing the engine 1 (at the left in FIG. 1) and a wall surface of the converter shell 11. Furthermore, the end portion of the input shaft 20 positioned closer to the engine 1 (at the left in FIGS. 1 to 5) is inserted into the hub 15c so as to be positioned radially inwardly of the hub 15c. A sealing member for sealing a clearance formed between the outer circumferential surface of the input shaft 20 and the inner circumferential surface of the hub 15c is retained between the end portion of the input shaft 20 positioned closer to the engine 1 and the inner circumferential surface of the hub 15c. The input shaft 20 is inserted into the turbine runner 14 so that a portion of the input shaft 20 extending from the portion corresponding to the hub 15c towards the transmission apparatus 3 is positioned radially inwardly of the turbine hub 14a. Furthermore, the input shaft 20 is spline-engaged with the turbine hub 14a so that the input shaft 20 is not rotatable relative to the turbine hub 14a (i.e. so that the input shaft 20 and the turbine hub 14a are rotated together as a unit). The input shaft 20 includes the stepped portion at a portion of the outer circumferential surface positioned in the vicinity of the inner circumferential surface of the pump cover 42. Still further, the input shaft 20 is arranged so that a portion thereof extending from a portion corresponding to the turbine hub 14a towards the transmission apparatus 3 is positioned radially inwardly of the shaft main body 18a of the stator shaft 18. The clearance is formed between the inner circumferential surface of the shaft main body 18a and a portion of the input shaft 20 extending from the stepped portion thereof towards the engine 1 (to the left in FIGS. 1 to 5), so that a bush is provided between the shaft main body 18a and the input shaft 20. Furthermore, the clearance formed between the inner circumferential surface of the shaft main body 18a and the outer circumferential surface of the input shaft 20 at the portion thereof extending from the stepped portion towards the engine 1 (to the left in FIGS. 1 to 5) is connected to the hydraulic passage 18e of the stator shaft 18 (the shaft main body 18a). Accordingly, the clearance (the third hydraulic passage) formed between the inner circumferential surface of the shaft main body 18a and the outer circumferential surface of the input shaft 20 at the portion thereof extending from the stepped portion towards the engine 1 (to the left in FIGS. 1 to 5) serves as a portion of the release hydraulic circuit 33 (see FIG. 4). On the other hand, plural sealing members for sealing a clearance formed between the outer circumferential surface of the input shaft 20 and the inner circumferential surface of the shaft main body 18a are retained by a portion of the input shaft 20 extending from the stepped portion towards the transmission apparatus 3 (to the right in FIGS. 1 to 5). The input shaft 20 includes the first bore portion 20a (the fourth hydraulic passage), which is formed on the input shaft 20 in a manner where a bore is formed so as to extend in the axial direction from an end surface of the input shaft 20 facing the engine 1 (to the left in FIGS. 1 to 5) by means of a drill or the like. The first bore portion 20a extends towards the vicinity of the pump cover 42. Furthermore, the input shaft 20 includes the second bore portion 20b at the position of the input shaft 20 extending from the stepped portion towards the transmission apparatus 3. The second bore portion 20b connects the hydraulic passage 18f of the stator shaft 18 (the shaft main body 18a) and the first bore portion 20a so as to establish a communication therebetween through the second bore portion 20b. Each of the first and the second bore portions 20a and 20b (the fourth hydraulic passages) serves as a portion of the lock-up clutch actuating hydraulic circuit 34 (see FIG. 5).

The transmission apparatus 3 changes a speed of the rotational force, which is inputted thereto from the input shaft 20, and then outputs the rotational force towards the driving wheel (see FIG. 1). More specifically, the rotational force outputted from the engine 1 is transmitted to a planetary gear mechanism (i.e. a combination of plural planetary gear mechanisms) via the torque converter 2. Then, the speed of the rotational force is changed by the planetary gear mechanisms, so that the rotational force, whose speed is changed by the planetary gear mechanisms, is outputted to the driving wheel. The transmission apparatus 3 is configured so as to selectively establish one of plural speed ranges in response to a combination of an engagement and a disengagement of plural friction engagement elements (e.g. a clutch, a brake and the like). Each of the friction engagement elements of the transmission apparatus 3 is controlled to be in an engaged state and in a disengaged state by the electronic control unit via a corresponding hydraulic pressure circuit.

The oil pump 4 sucks the oil within an oil pan in response to the rotational force of the crankshaft 1a of the engine 1, which is inputted into the oil pump 4 via the converter shell 11 of the torque converter 2, and discharges the oil (see FIG. 1). More specifically, the oil pump 4 is configured as an internal gear pump, which transfers the oil by using a meshed portion between the external gear 43 and an internal gear 44 within a pump chamber 41a of the pump body 41 (see FIGS. 1 to 5).

The pump body 41 is fixed on a case of the transmission apparatus 3 together with the pump cover 42 in a state where the pump body 41 and the pump cover 42 overlap with each other in the axial direction of the input shaft 20. The pump body 41 is rotatably supported by the sleeve 11a at an inner circumferential surface of the pump body 41 via the bush 45 (in this embodiment, two bushes 45 are provided between the outer circumferential surface of the sleeve 11a and the inner circumferential surface of the pump body 41). A clearance formed between the pump body 41 and the sleeve 11a is sealed by means of the sealing member 46 at a position closer to the engine 1 (i.e. at the left in FIGS. 1 to 5). The pump body 41 includes the pump chamber 41a at a portion thereof closer to the transmission apparatus 3 relative to the bushes 45. The pump cover 42 covers an opening of the pump chamber 41a, which opens towards the transmission apparatus 3. A portion of the shaft main body 18a and a portion of the cover 18b are fluid-tightly inserted into the pump cover 42 so as to be fitted on the inner circumferential surface thereof. Furthermore, the pump cover 42 includes a hydraulic passage 42a, which is in communication with the clearance formed between the inner circumferential surface of the sleeve 11a and the outer circumferential surface of the cover 18b (see FIG. 2). The hydraulic passage 42a (the first hydraulic passage) serves as a portion of the impeller clutch actuating hydraulic circuit 31. The pump cover 42 also includes the hydraulic passage 42b, which is in communication with the groove portion 18d of the stator shaft 18 (see FIG. 3). The hydraulic passage 42b (the second hydraulic passage) serves as a portion of the supply hydraulic circuit 32. Still further, the pump cover 42 includes the hydraulic passage 42c, which is in communication with the hydraulic passage 18e of the stator shaft 18 (see FIG. 4). The hydraulic passage 42c (the third hydraulic passage) serves as a portion of the release hydraulic circuit 33. Moreover, the pump cover 42 includes the hydraulic passage 42d, which is in communication with the hydraulic passage 18f of the stator shaft 18 (see FIG. 5). The hydraulic passage 42d (the fourth hydraulic passage) serves as a portion of the lock-up clutch actuating hydraulic circuit 34. The external gear 43, which is formed in an annular shape, is engaged with the inner gear 44 at a portion of the outer circumferential surface of the external gear 43 and is spline-engaged with the sleeve 11a at the inner circumferential surface of the external gear 43 so as not to be rotatable relative to the sleeve 11a. On the other hand, the internal gear 4 is an annular shaped member having teeth at the inner circumferential surface of the internal gear 4 and is arranged within the pump chamber 41a while allowing the internal gear 4 to rotate.

The impeller clutch actuating hydraulic circuit 31 includes the hydraulic passage 42a of the pump cover 42, the clearance formed between the outer circumferential surface of the intermediate portion of the cover 18b and the inner circumferential surface of the sleeve 11a, and the hydraulic passage 11b of the sleeve 11a (see FIG. 2). The supply hydraulic circuit 32 includes the hydraulic passage 42b of the pump cover 42, the groove portion 18d of the shaft main body 18a, and the clearance formed between the impeller hub 12a and the first stator support member 16a (see FIG. 3). The release hydraulic circuit 33 includes the hydraulic passage 16c of the second stator support member 16b, the hydraulic passage 14b of the turbine hub 14a, the clearance formed between the inner circumferential surface of the shaft main body 18a and the outer circumferential surface of the input shaft 20, the hydraulic passage 18e of the shaft main body 18 and the hydraulic passage 42c of the pump cover 42 (see FIG. 4). The lock-up clutch actuating hydraulic circuit 34 includes the hydraulic passage 42d of the pump cover 42, the hydraulic passage 18f of the shaft main body 18a, the first and second bore portions 20a and 20b of the input shaft 20, and the hydraulic passage 15d of the hub 15c.

According to the first embodiment, because the portion of the supply hydraulic circuit 32 is formed at the stator shaft 18, the clutch apparatus having four hydraulic circuits may be achieved without changing a shape of the input shaft 20, which is also adapted to a clutch apparatus having three hydraulic circuits. Accordingly, manufacturing costs of the clutch apparatus according to the first embodiment may be reduced when comparing to a know clutch apparatus. Furthermore, according to the first embodiment, because the supply hydraulic circuit 32 is configured so as not to include the hydraulic passage formed on the input shaft 20, an increase of the input shaft 20 in a radial direction thereof and an elongation of the input shaft 20 in the axial direction thereof may be avoided.

Second Embodiment

Figure 6:
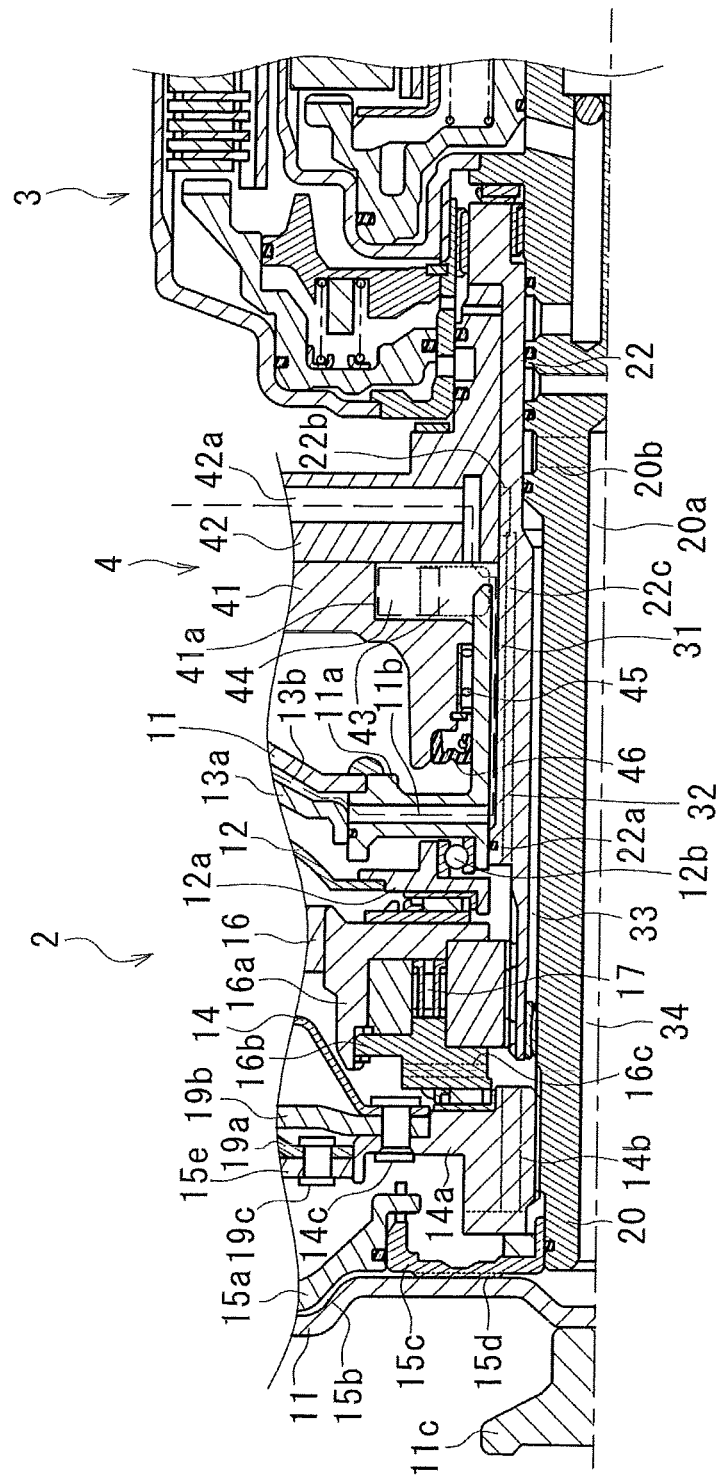
FIG. 6 is a cross-sectional diagram for explaining an impeller clutch actuating hydraulic circuit of a clutch apparatus according to a second embodiment.
Figure 7:
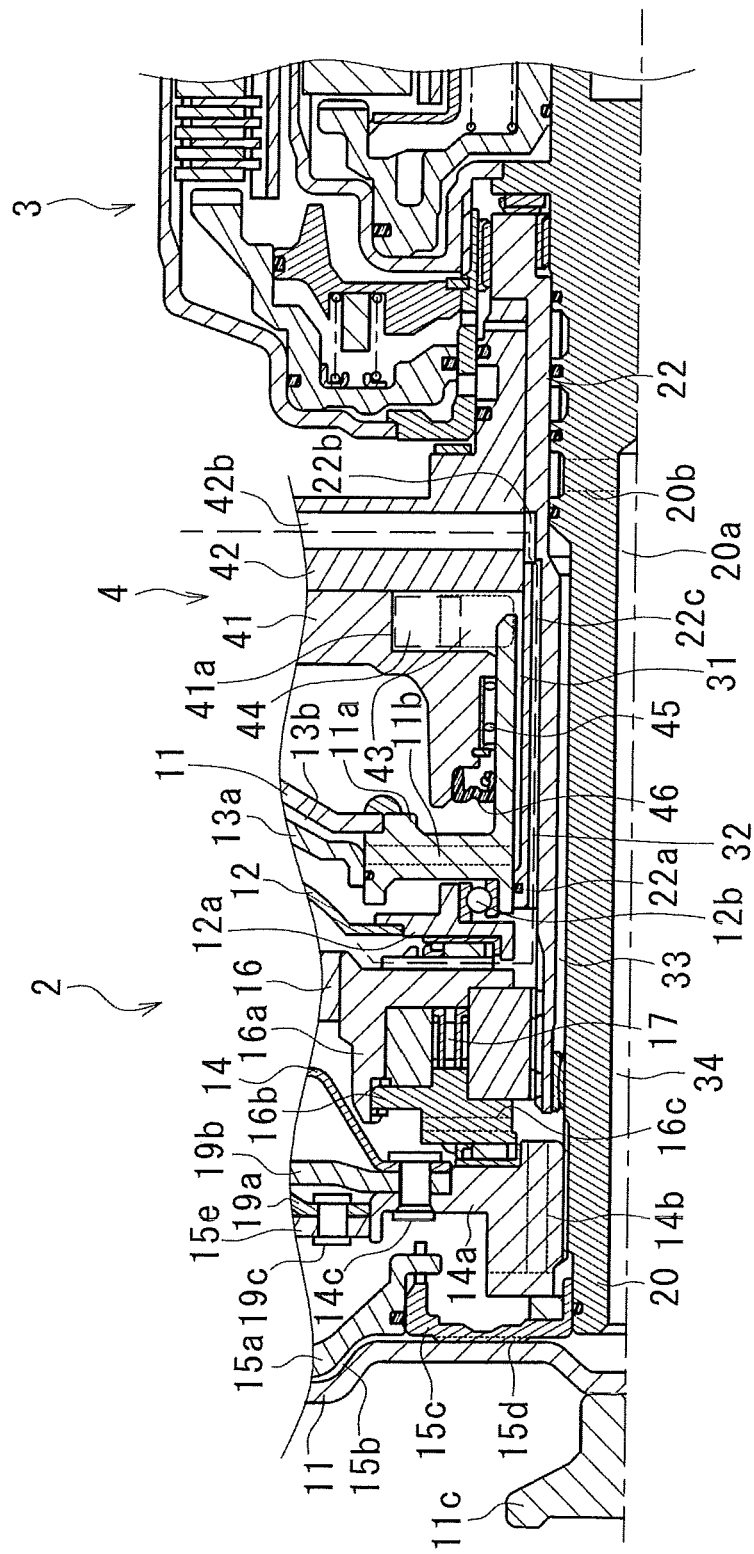
FIG. 7 is a cross-sectional diagram for explaining a supply hydraulic circuit of the clutch apparatus according to the second embodiment.

A second embodiment of the clutch apparatus will be described below with reference to the attached drawings. Illustrated in FIG. 6 is a cross-sectional diagram for explaining an impeller clutch actuating hydraulic circuit of the clutch apparatus according to the second embodiment. Illustrated in FIG. 7 is a cross-sectional diagram for explaining a supply hydraulic circuit of the clutch apparatus according to the second embodiment.

The clutch apparatus according to the second embodiment is a modified example of the clutch apparatus according to the first embodiment. More specifically, the clutch apparatus according to the second embodiment differs from the clutch apparatus according to the first embodiment in that a component corresponding to the shaft main body 18a (see FIGS. 2 to 5) and a component corresponding to the cover 18b (see FIGS. 2 to 5) are integrally formed as a stator shaft 22 instead of forming the stator shaft as an assembly of the shaft main body and the cover. Other configurations of the clutch apparatus according to the second embodiment are similar to the clutch apparatus according to the first embodiment. Accordingly, only the differences between the clutch apparatus according to the first embodiment and the clutch apparatus according to the second embodiment will be described below.

A stepped portion is formed on an outer circumferential surface of the stator shaft 22 at a position closer to the engine 1 (i.e. at the left in FIGS. 6 and 7) relative to the hydraulic passage 11b of the sleeve 11a. The stator shaft 22 includes a bore portion 22c (the internal hydraulic passage). More specifically, the bore portion 22c is formed on the stator shaft 22 by forming a bore from a side surface of the stepped portion facing the engine 1 so as to extend along an axial direction of the stator shaft 22 by means of a drill or the like. Furthermore, the bore portion 22c extends from the wall surface of the stepped portion towards the vicinity of the pump cover 42. Additionally, the stator shaft 22 includes a connecting hole portion 22b (a bore portion) (the internal hydraulic passage), which connects the hydraulic passage 42b of the pump cover 42 and the bore portion 22c so as to establish a communication therebetween through the connecting hole portion 22b. Each of the bore portion 22b (the second hydraulic passage) and the connecting hole portion 22c (the second hydraulic passage) serves as a portion of the supply hydraulic circuit 32 (see FIG. 7). A sealing member 22a for sealing a clearance formed between the stator shaft 22 and the sleeve 11a is retained by a portion of the outer circumferential surface of the stator shaft 22 between the stepped portion thereof and the hydraulic passage 11b. The sealing member 22a separates the impeller clutch actuating hydraulic circuit 31 and the supply hydraulic circuit 32. A clearance (the first hydraulic passage) formed between a portion of the outer circumferential surface of the stator shaft 22 extending towards the transmission apparatus 3 from the vicinity of the sealing member 22a and the inner circumferential surface of the sleeve 11a serves as a portion of the impeller clutch actuating hydraulic circuit 31 (see FIG. 6). Other configurations of the stator shaft 22 are similar to the stator shaft 18 of the first embodiment (see FIGS. 2 to 5).

According to the second embodiment, advantages and merits similar to the first embodiment may be achieved. Furthermore, a number of components of the clutch apparatus according to the second embodiment may be reduced when comparing to the first embodiment.

Third Embodiment

Figure 8:
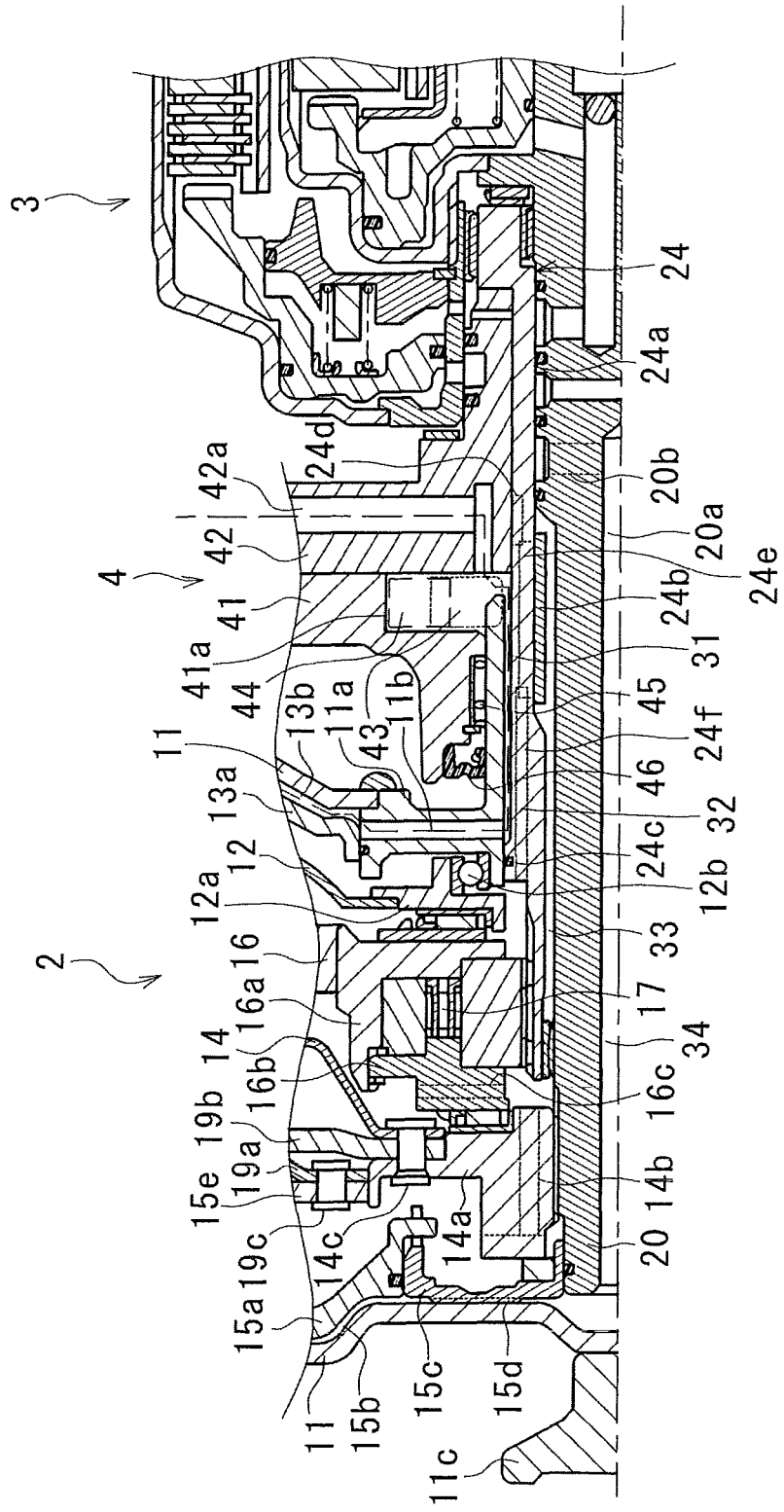
FIG. 8 is a cross-sectional diagram for explaining an impeller clutch actuating hydraulic circuit of a clutch apparatus according to a third embodiment.

A third embodiment of the clutch apparatus will be described below with reference to the attached drawings. Illustrated in FIG. 8 is a cross-sectional diagram for explaining an impeller clutch actuating hydraulic circuit of the clutch apparatus according to the third embodiment. Illustrated in FIG. 9 is a cross-sectional diagram for explaining a supply hydraulic circuit of the clutch apparatus according to the third embodiment.

The clutch apparatus according to the third embodiment is another modified example of the clutch apparatus according to the first embodiment. More specifically the clutch apparatus according to the third embodiment differs from the clutch apparatus according to the first embodiment in that a stator shaft 24 is formed as a unit in which a cover 24b is fluid-tightly fitted on an inner circumferential surface of a shaft main body 24a, instead of forming the stator shaft (18) as a unit in which the cover (18b) is fitted onto the outer circumferential surface of the shaft main body (18a). Other configurations of the clutch apparatus according to the third embodiment are similar to the first embodiment. Accordingly, only the difference between the clutch apparatus according to the first embodiment and the clutch apparatus according to the third embodiment will be described below.

A stepped portion is formed on the inner circumferential surface of the shaft main body 24a. Furthermore, a groove portion 24e (the internal hydraulic passage) is formed on a portion of the inner circumferential surface at a position closer to the transmission apparatus 3 relative to the stepped portion. The cover 24b is press-fittedly inserted into the shaft main body 24a and fluid-tightly fitted on the inner circumferential surface of the shaft main body 24a so as to fluid-tightly cover the entire groove portion 24e. The shaft main body 24a includes another stepped portion at an outer circumferential surface thereof at a position closer to the engine 1 (i.e. at the left in FIGS. 8 and 9) relative to the hydraulic passage 11b of the sleeve 11a. The shaft main body 24a includes a bore portion 24f (the second hydraulic passage) (the internal hydraulic passage), which is formed so as to extend from a side wall surface of the stepped portion formed at the outer circumferential surface of the shaft main body 24a and facing the engine 1 to the groove portion 24e, which corresponds to the second hydraulic passage in this embodiment, by means of a drill or the like so as to be in communication therewith. A sealing member 24c for sealing a clearance formed between the shaft main body 24a and the sleeve 11a is retained at the portion of the outer circumferential surface of the shaft main body 24a between the stepped portion formed at the outer circumferential surface of the shaft main body 24a and the hydraulic passage 11b. The sealing member 24c separates the impeller clutch actuating hydraulic circuit 31 and the supply hydraulic circuit 32. A clearance (the first hydraulic passage) formed between a portion of the outer circumferential surface of the shaft main body 24a extending towards the transmission apparatus 3 from the vicinity of the sealing member 24c and the inner circumferential surface of the sleeve 11a serves as a portion of the impeller clutch actuating hydraulic circuit 31 (see FIG. 8). Furthermore, the shaft main body 24a includes a connecting hole portion 24d (a bore portion, which also serves as the second hydraulic passage) (the internal hydraulic passage), which extends from the hydraulic passage 42b of the pump cover 24 to the groove portion 24e so as to establish a communication therebetween through the connecting hole portion 24d (see FIG. 9). Each of the connecting hole portion 24d, the groove portion 24e and the bore portion 24f serves as a portion of the supply hydraulic circuit 32. Other configurations of the shaft main body 24a are similar to the shaft main body 18a of the first embodiment (see FIGS. 2 to 5).

Figure 9:
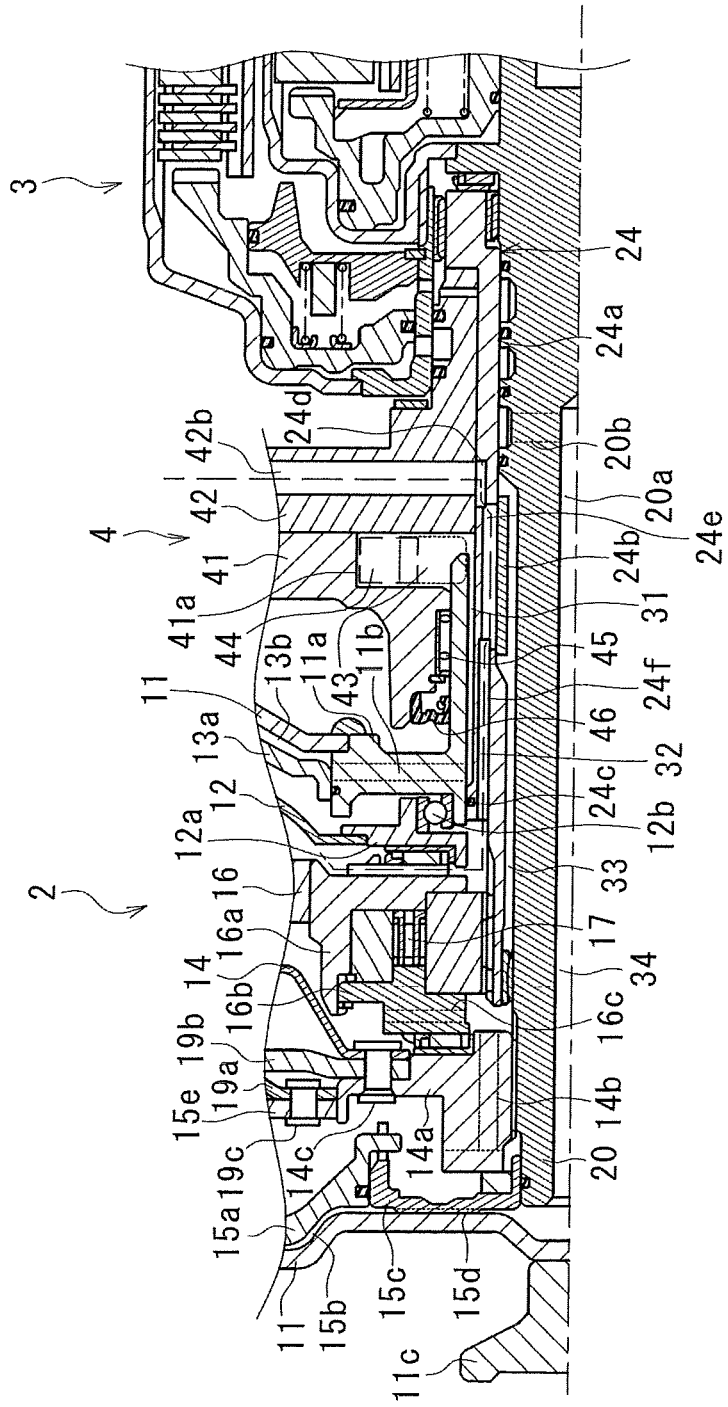
FIG. 9 is a cross-sectional diagram for explaining a supply hydraulic circuit of the clutch apparatus according to the third embodiment.

The cover 24b is a cylinder-shaped member for covering the entire groove portion 24e, which is formed on the inner circumferential surface of the shaft main body 24a (see FIGS. 8 and 9). The cover 24b is press-fittedly fixed on the inner circumferential surface of the shaft main body 24a so as to fluid-tightly cover the entire groove portion 24e. Furthermore, the cover 24b separates the impeller clutch actuating hydraulic circuit 31 and the supply hydraulic circuit 32 (see FIG. 9). A clearance formed between an inner circumferential surface of the cover 24b and the outer circumferential surface of the input shaft 20 serves as a portion of the release hydraulic circuit 33.

According to the third embodiment, advantages and merits similar to the first embodiment may be achieved.

Fourth Embodiment

Figure 10:
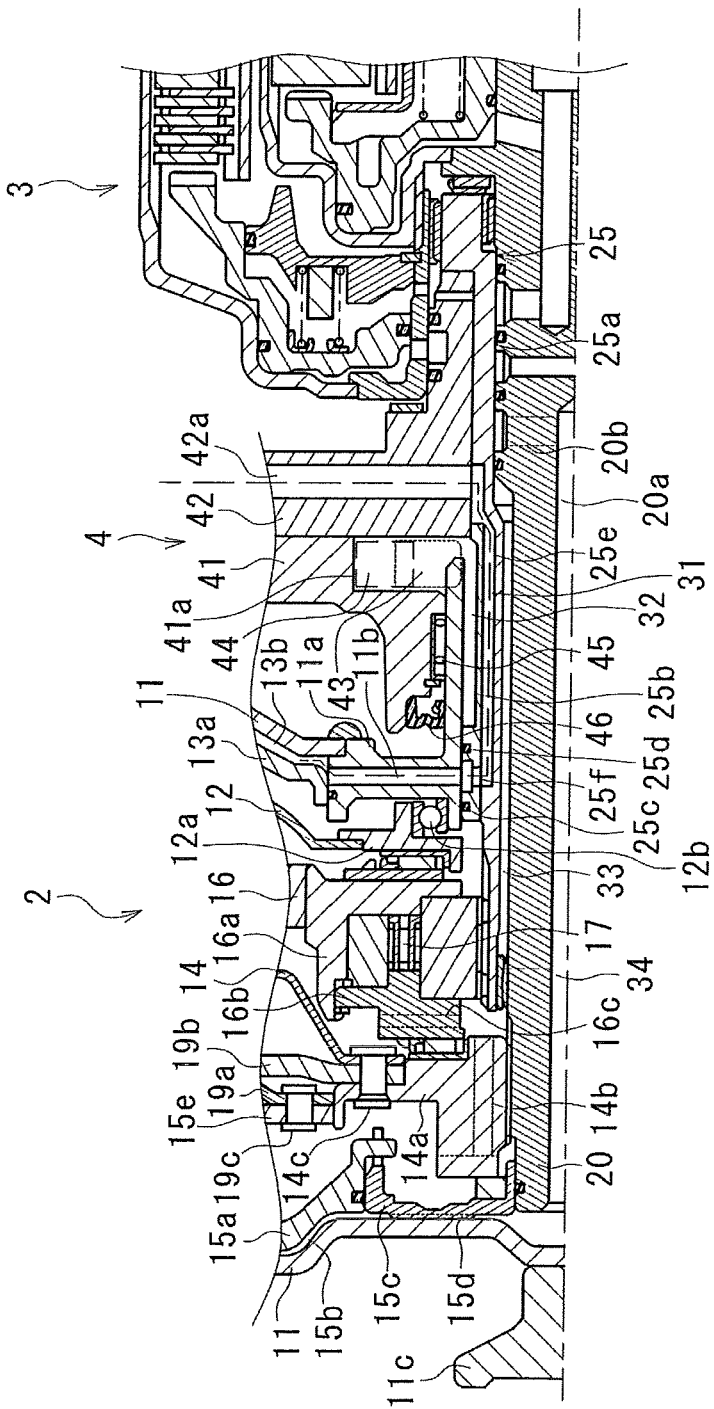
FIG. 10 is a cross-sectional diagram for explaining an impeller clutch actuating hydraulic circuit of a clutch apparatus according to a fourth embodiment.

A fourth embodiment of the clutch apparatus will be described below with reference to the attached drawings. Illustrated in FIG. 10 is a cross-sectional diagram for explaining an impeller clutch actuating hydraulic circuit of the clutch apparatus according to the fourth embodiment. Illustrated in FIG. 11 is a cross-sectional diagram for explaining a supply hydraulic circuit of the clutch apparatus according to the fourth embodiment.

The clutch apparatus according to the fourth embodiment is a modified example of the clutch apparatus according to the first embodiment. More specifically, in the fourth embodiment, the configurations of the stator shaft and the pump cover are modified so that a supply of the oil to the portion of the clutch apparatus between the pump impeller 12 and the turbine runner 14 and a lubrication of the bushes 45, which are provided between the pump body 41 and the sleeve 11a are simultaneously achieved (see FIG. 11). Other configurations of the clutch apparatus according to the fourth embodiment are similar to the clutch apparatus according to the first embodiment. Accordingly, only the difference between the clutch apparatus according to the first embodiment and the clutch apparatus according to the fourth embodiment will be described below.

Figure 11:
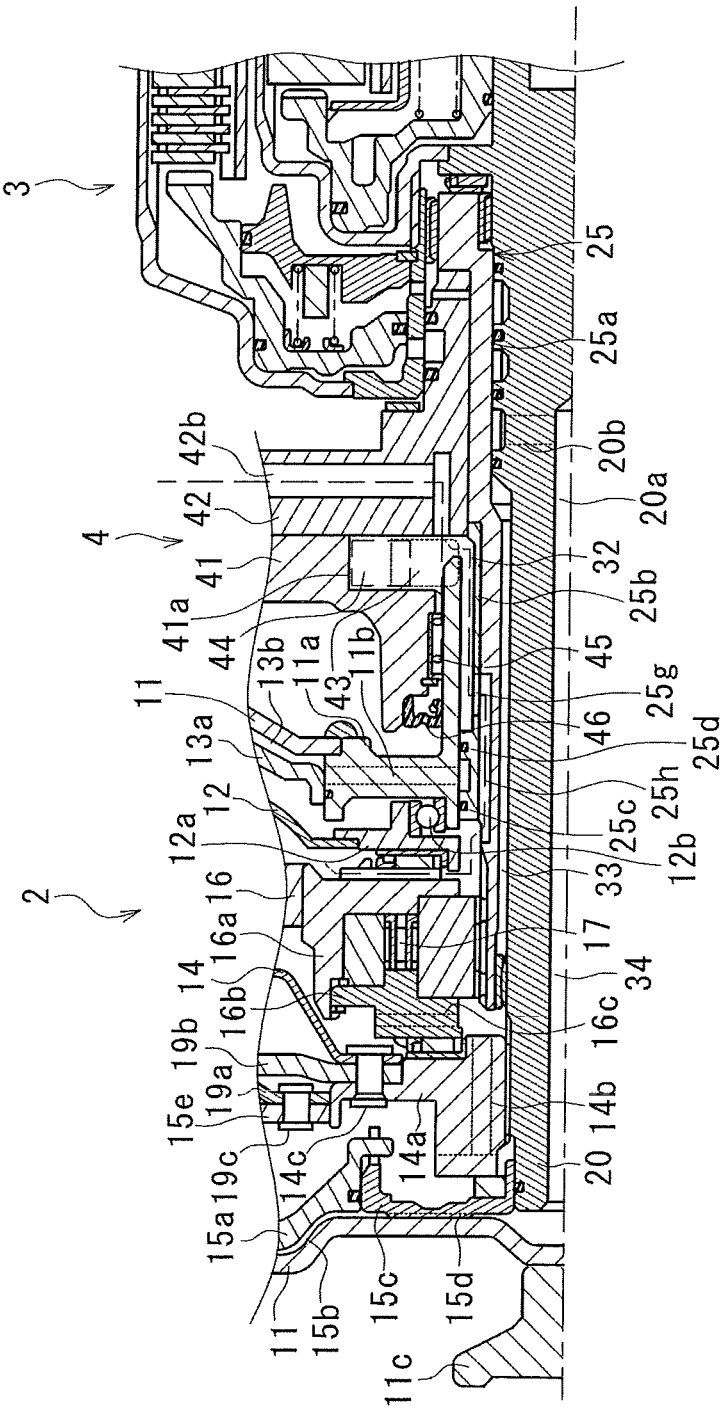
FIG. 11 is a cross-sectional diagram for explaining a supply hydraulic circuit of the clutch apparatus according to the fourth embodiment.

A stator shaft 25 is configured as a unit, in which a cover 25b is press-fittedly inserted onto an outer circumferential surface of a shaft main body 25a (see FIGS. 10 and 11). Plural hydraulic passages (e.g. a portion of the impeller clutch actuating hydraulic circuit 31, a portion of the supply hydraulic circuit 32 in this embodiment) are formed at the stator shaft 25.

A portion of the shaft main body 25a is press-fittedly inserted into the pump cover 42 so as to be fluid-tightly fitted and fixed on the inner circumferential surface of the pump cover 42 together with a portion of the cover 25b. A first groove portion 25e (the internal hydraulic passage, a first internal hydraulic passage) is formed on the outer circumferential surface of the shaft main body 25a so as to extend from the hydraulic passage 42a of the pump cover 42 to the vicinity of the hydraulic passage 11b of the sleeve 11a (see FIG. 10). The first groove portion 25e is connected to the hydraulic passage 42a of the pump cover 42 so as to be in communication therewith. The cover 25b is press-fittedly fixed on the shaft main body 25a so as to fluid-tightly seal the first groove portion 25e except for a portion of the first groove portion 25e that is connected to the hydraulic passage 42a. A clearance (the first hydraulic passage) formed between the first groove portion 25e and the cover 25b serves as a portion of the impeller clutch actuating hydraulic circuit 31. Furthermore, the clearance formed between the first groove portion 25e and the cover 25b is connected to the oil chamber 13b of the impeller clutch 13 through a first connecting hole portion 25f (a bore portion, a first bore portion) (the internal hydraulic passage, the first internal hydraulic passage) of the cover 25b and the hydraulic passage 11b of the sleeve 11a. A second groove portion 25h (the internal hydraulic passage, a second internal hydraulic passage) is formed on the outer circumferential surface of the shaft main body 25a separately and independently of the first groove portion 25e (i.e. at a different portion from a portion where the first groove portion 25e is formed so that the second groove portion 25h is separated from the first groove portion 25e). More specifically, the second groove portion 25h is formed so as to extend from a portion of the shaft main body 25a corresponding to an intermediate portion of the cover 25b in the axial direction towards the engine 1 so that one end portion of the second groove portion 25h is positioned further closer to the engine 1 than an end portion of the cover 25b (an end portion of the cover 25b positioned at the left in FIG. 11) (see FIG. 11). Accordingly, the second groove portion 25h is in communication with the clearance formed between the stator 16 and the pump impeller 12. On the other hand, the other end portion of the second groove portion 25h positioned closer to the transmission apparatus 3 is connected to (in communication with) the clearance formed between the inner circumferential surface of the sleeve 11a and the outer circumferential surface of the cover 25b through a second connecting hole portion 25g (a bore portion, a second bore portion) (the internal hydraulic passage, the second internal hydraulic passage) of the cover 25. The clearance (the second hydraulic passage) formed between the groove portion 25h and the cover 25b serves as a portion of the supply hydraulic circuit 32. Other configurations of the shaft main body 25a are similar to the shaft main body 18a of the first embodiment (see FIGS. 2 to 5).

The cover 25b is a cylinder-shaped member for covering the first and second groove portions 25e and 25h, which are formed on the outer circumferential surface of the shaft main body 25a at the different portions thereof. The cover 25b is press-fittedly inserted and fixed onto the shaft main body 25a in a fluid-tight manner. Furthermore, the cover 25b separates the impeller clutch actuating hydraulic circuit 31 and the supply hydraulic circuit 32. An end portion of the cover 25b positioned closer to the transmission apparatus 3 is press-fittedly inserted into the pump covert 42 so as to be fitted and fixed on the inner circumferential surface of the pump cover 42 together with the portion of the shaft main body 25a in a fluid-tight manner. A first sealing member 25c is retained by an end portion of the outer circumferential surface of the cover 25b positioned closer to the engine 1 (at the left in FIGS. 10 and 11) in order to seal the clearance formed between the cover 25b and the sleeve 11a. A second sealing member 25d is retained by a portion of the outer circumferential surface of the cover 25b positioned closer to the transmission apparatus 3 relative to the hydraulic passage 11b of the sleeve 11a in order to seal the clearance formed between the outer circumferential surface of the cover 25b and the inner circumferential surface of the sleeve 11a. The first and second sealing members 25c and 25d separate the impeller clutch actuating hydraulic circuit 31 and the supply hydraulic circuit 32. The cover 25b includes the first connecting hole portion 25f (the first hydraulic passage), which connects the clearance formed between the inner circumferential surface of the cover 25b and the groove portion 25e of the shaft main body 25a with the hydraulic passage 11b of the sleeve 11a (see FIG. 10) so as to establish a communication therebetween through the first connecting hole portion 25f, at a portion of the shaft main body 25a corresponding to the end portion of the first groove portion 20a positioned closer to the engine 1. Each of the clearance formed between the inner circumferential surface of the cover 25b and the groove portion 25e of the shaft main body 25a, and the first connecting hole portion 25f serves as a portion of the impeller clutch actuating hydraulic circuit 31. The cover 25b includes the second connecting hole portion 25g (the second hydraulic passage), which connects a portion of the clearance formed between the outer circumferential surface of the cover 25b and the inner circumferential surface of the sleeve 11a extending towards the transmission apparatus 3 relative to the second sealing member 25d with the clearance formed between the inner circumferential surface of the cover 25b and the groove portion 25h of the shaft main body 25a so as to establish a communication therebetween through the second connecting hole portion 25g (see FIG. 11). Each of the clearance (the second hydraulic passage) formed between the outer circumferential surface of the cover 25b and the inner circumferential surface of the sleeve 11a and extending towards the transmission apparatus 3 relative to the second sealing member 25d, the second connecting hole portion 25g, and the clearance formed between the inner circumferential surface of the cover 25b and the groove portion 25h of the shaft main body 25a serves as a portion of the supply hydraulic circuit 32.

The pump cover 42 includes the hydraulic passage 42a (the first hydraulic passage), which is connected to (in communication with) the first groove portion 25e of the stator shaft 25 (see FIG. 10). The hydraulic passage 42a serves as a portion of the impeller clutch actuating hydraulic circuit 31. Furthermore, the pump cover 42 includes the hydraulic passage 42b (the second hydraulic passage), which is connected to (in communication with) the clearance formed between the inner circumferential surface of the sleeve 11a and the outer circumferential surface of the cover 25b, and the clearance, which is formed between the outer circumferential surface of the sleeve 11a and the inner circumferential surface of the pump body 41 and in which the bushes 45 are provided (see FIG. 11). The hydraulic passage 42b serves as a portion of the supply hydraulic circuit 32.

According to the fourth embodiment, because a portion of the impeller clutch actuating hydraulic circuit 31 and a portion of the supply hydraulic passage 32 are formed on the stator shaft 25, the supply of the oil to the portion of the clutch apparatus between the pump impeller 12 and the turbine runner 14 and the lubrication of the bushes 45, which are provided between the pump body 41 and the sleeve 11a, are simultaneously achieved. Therefore, the oil, which is cooled down and which normally flows through the supply hydraulic circuit 32 while the engine 1 is rotated (i.e. the oil within the supply hydraulic circuit 32 colder than the oil flowing through the impeller clutch actuating hydraulic circuit 31) is supplied to the bushes 45 in order to lubricate the bushes 45, which may further result in extending a life of the clutch apparatus. Furthermore, the clutch apparatus having the four hydraulic circuits may be achieved without changing the shape of the input shaft 20, which is also adapted to a clutch apparatus having the three hydraulic circuits. Accordingly, manufacturing costs of the clutch apparatus according to the fourth embodiment may be reduced when comparing to a known clutch apparatus. Still further, because the impeller clutch actuating hydraulic circuit 31 and the supply hydraulic circuit 32 do not include hydraulic passage formed at the input shaft 20, an increase of a size of the input shaft 20 in the radial direction and in the axial direction may be avoided.

Fifth Embodiment

Figure 12:
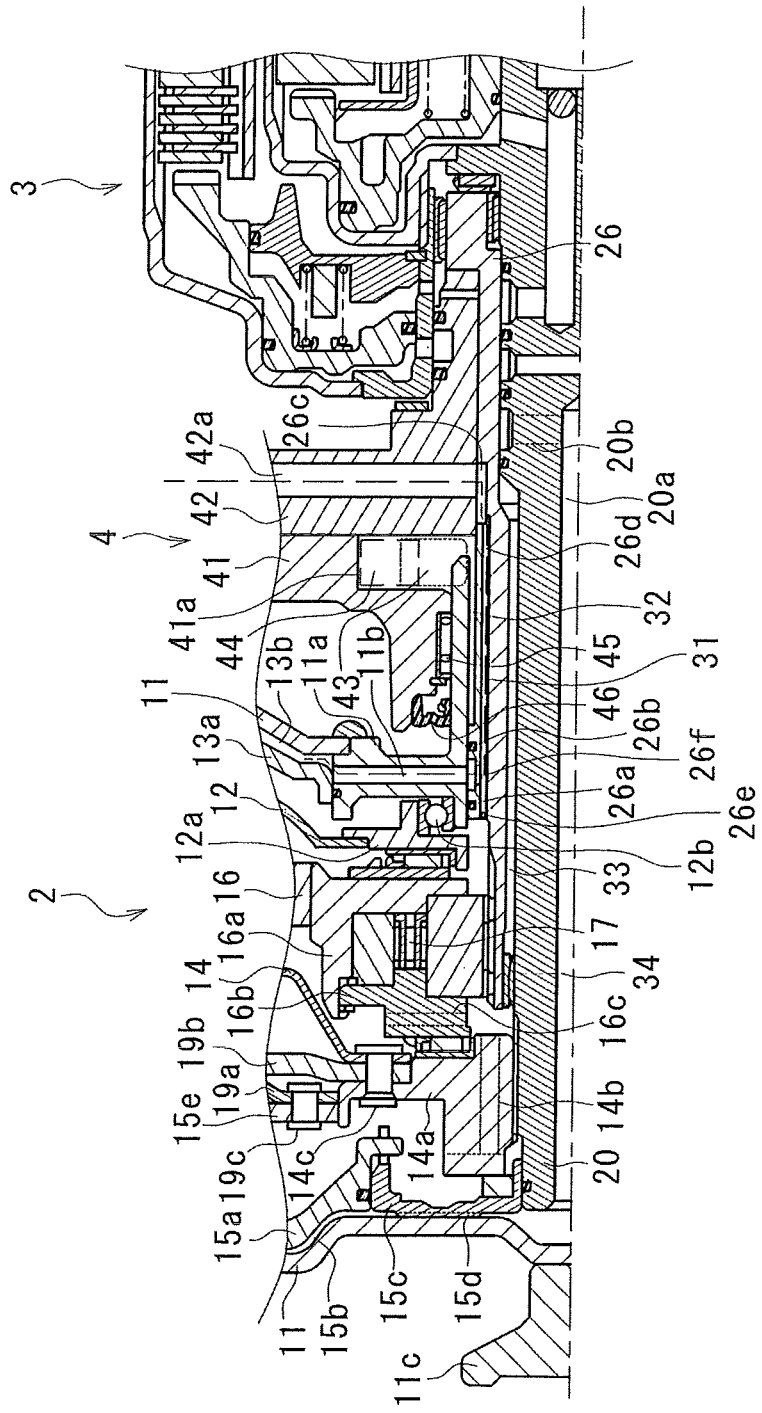
FIG. 12 is a cross-sectional diagram for explaining an impeller clutch actuating hydraulic circuit of a clutch apparatus according to a fifth embodiment.
Figure 13:
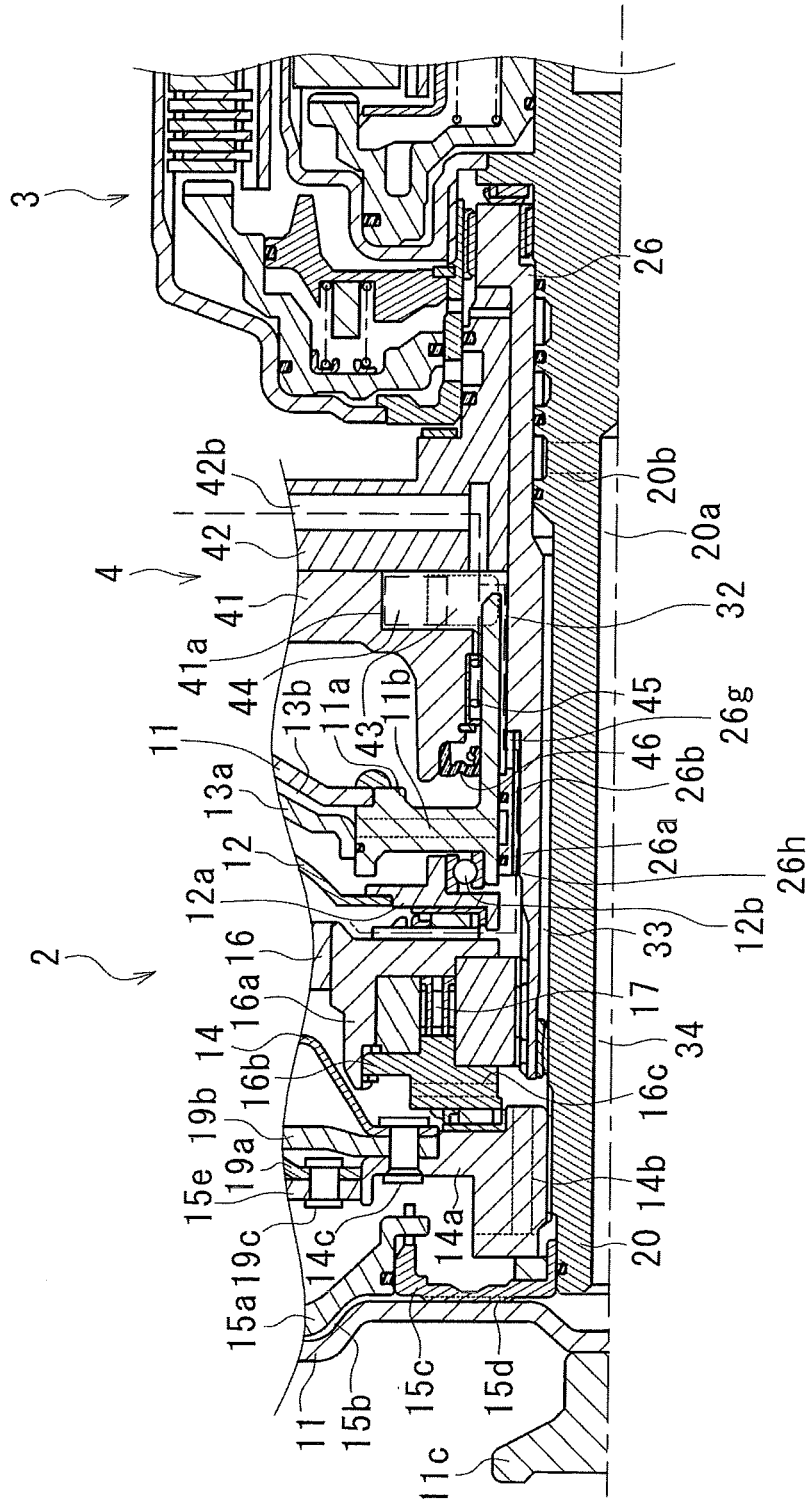
FIG. 13 is a cross-sectional diagram for explaining a supply hydraulic circuit of the clutch apparatus according to the fifth embodiment.

A fifth embodiment of the clutch apparatus will be described below with reference to the attached drawings. Illustrated in FIG. 12 is a cross-sectional diagram for explaining an impeller clutch actuating hydraulic circuit of the clutch apparatus according to the fifth embodiment. Illustrated in FIG. 13 is a cross-sectional diagram for explaining a supply hydraulic circuit of the clutch apparatus according to the fifth embodiment.

The clutch apparatus according to the fifth embodiment is a modified example of the clutch apparatus according to the fourth embodiment. More specifically, the clutch apparatus according to the fifth embodiment differs from the clutch apparatus according to the fourth embodiment in that the clutch apparatus according to the fifth embodiment is configured so as to simultaneously achieve the supply of the oil to the portion (including a space) of the clutch apparatus between the pump impeller 12 and the turbine impeller 14 and the lubrication of the bushes 45, which are provided between the pump body 41 and the sleeve 11a. Furthermore, the clutch apparatus according to the fifth embodiment differs from the clutch apparatus according to the fourth embodiment in that a stator shaft 26 integrally includes a component corresponding to the shaft main body 25a (see FIGS. 10 and 11) and a component corresponding to the cover 25b (see FIGS. 10, 11), instead of configuring the stator shaft (25) as a unit of the shaft main body (25a) and the cover (25b) as described in the fourth embodiment. Other configurations of the clutch apparatus according to the fifth embodiment are similar to the clutch apparatus according to the fourth embodiment. Therefore, only the difference between the clutch apparatus according to the fourth embodiment and the clutch apparatus according to the fifth embodiment will be described below.

The stator shaft 26 includes a stepped portion on an outer circumferential surface thereof at a position closer to the engine 1 (at the left in FIGS. 12 and 13) relative to the hydraulic passage 11b of the sleeve 11a. The stator shaft 26 includes a first bore portion 26d (the internal hydraulic passage), which is formed at the stator shaft 26 so as to extend along the axial direction from a side wall surface of the stepped portion by means of a drill or the like. More specifically, the first bore portion 26d (the first hydraulic passage) extends from the side wall surface of the stepped portion to the vicinity of the pump cover 42. A ball member 26e is press-fittedly provided on the first bore portion 26d in a fluid-tight manner so as to be positioned closer to the engine 1 (at the left in FIGS. 12 and 13) relative to a second connecting hole portion 26f (a bore portion) (the internal hydraulic passage). The stator shaft 26 further includes a first connecting hole portion 26c (a bore portion) (the internal hydraulic passage) extending from the hydraulic passage 42a of the pump cover 42 to the first bore portion 26d, so that the hydraulic passage 42a of the pump cover 42 and the first bore portion 26d are in communication with each other through the first connecting hole portion 26c (the first hydraulic passage). Still further, the stator shaft 26 includes the second connecting hole portion 26f (the first hydraulic passage) for connecting the first bore portion 26d and the hydraulic passage 11b of the sleeve 11a so as to establish a communication therebetween though the second connecting hole portion 26f. Each of the first connecting hole portion 26c, the first bore portion 26d and the second connecting hole portion 26f serves as a portion of the impeller clutch actuating hydraulic circuit 31 (see FIG. 12). The stator shaft 26 includes a second bore portion 26h (the second hydraulic passage) separately and independently of the second bore portion 26d. More specifically, the second bore portion 26h is formed at the stator shaft 26 so as to extend from the side wall surface of the stepped portion facing the engine 1 (but at the different position from the first bore portion 26d) along the axial direction by means of the drill or the like. Furthermore, the second bore portion 26h is formed at the stator shaft 26 so as to extend towards the transmission apparatus 3, so that an inner end portion of the second bore portion 26h is positioned closer to the transmission apparatus than a second sealing member 26b. The stator shaft 26 includes a third connecting hole portion 26g (the second hydraulic passage) at an outer circumferential portion thereof at a position closer to the transmission apparatus 3 relative to the second sealing member 26b. The third connecting hole portion 26g connects a clearance formed between the outer circumferential surface of the stator shaft 26 and the inner circumferential surface of the sleeve 11a with the second bore portion 26h so as to establish a communication therebetween through the third connecting hole portion 26g. Each of a portion of the clearance (the second hydraulic passage) formed between the outer circumferential surface of the stator shaft 26 and the inner circumferential surface of the sleeve 11a positioned closer to the transmission apparatus 3 relative to the second sealing member 26b, the third connecting hole portion 26g, and the second bore portion 26h serves as a portion of the supply hydraulic circuit 32 (see FIG. 13). A first sealing member 26a for sealing the clearance formed between the stator shaft 26 and the sleeve 11a is retained by an outer circumferential portion of the stator shaft 26 at a position between the stepped portion and the hydraulic passage 11b. Furthermore, the second sealing member 26b for sealing the clearance formed between the outer circumferential surface of he stator shaft 26 and the inner circumferential surface of the sleeve 11a is retained by the outer circumferential portion of the stator shaft 26 at a position closer to the transmission apparatus 3 relative to the hydraulic passage 11b of the sleeve 11a. The first and second sealing members 26a and 26b separate the impeller clutch actuating hydraulic circuit 31 and the supply hydraulic circuit 32. Other configurations of the stator shaft 26 are similar to the stator shaft 25 of the fourth embodiment (see FIGS. 10 and 11).

According to the fifth embodiment, the clutch apparatus according to the fifth embodiment may achieve advantages and merits similar to the clutch apparatus according to the fourth embodiment. Furthermore, a number of components used for the clutch apparatus according to the fifth embodiment may be reduced when comparing to the clutch apparatus according to the fourth embodiment.

Sixth Embodiment

Figure 14:
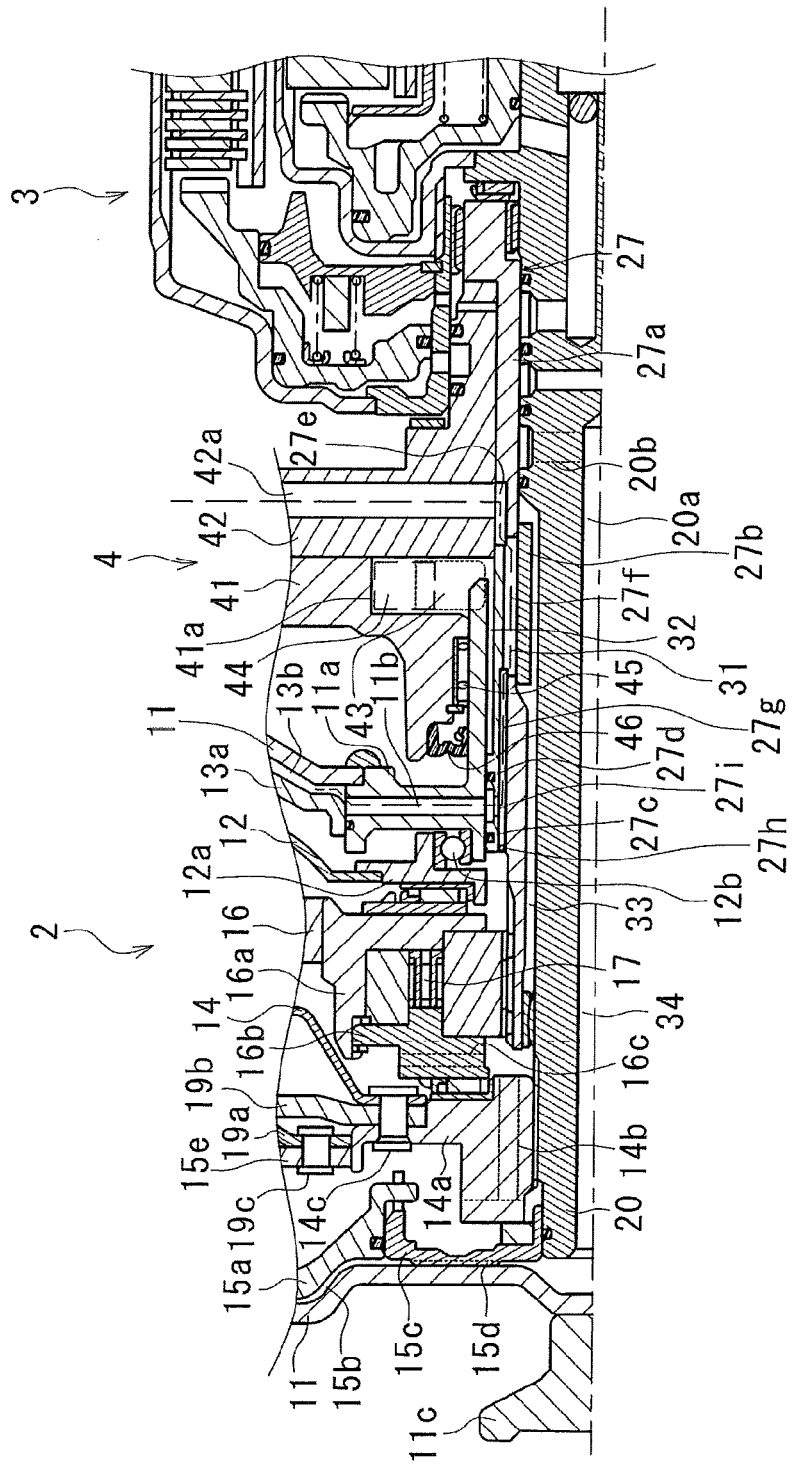
FIG. 14 is a cross-sectional diagram for explaining an impeller clutch actuating hydraulic circuit of a clutch apparatus according to a sixth embodiment.

A sixth embodiment of the clutch apparatus will be described below with reference to the attached drawings. Illustrated in FIG. 14 is a cross-sectional diagram for explaining an impeller clutch actuating hydraulic circuit of the clutch apparatus according to the sixth embodiment. Illustrated in FIG. 15 is a cross-sectional diagram for explaining a supply hydraulic circuit of the clutch apparatus according to the sixth embodiment.

The clutch apparatus according to the sixth embodiment is another modified example of the clutch apparatus according to the fourth embodiment. More specifically, the clutch apparatus according to the sixth embodiment differs from the clutch apparatus according to the fourth embodiment in that the clutch apparatus according to the sixth embodiment is configured so that the supply of the oil to the portion of the clutch apparatus (including the space) formed between the pump impeller 12 and the turbine runner 14 and the lubrication of the bushes 45, which are provided between the pump body 41 and the sleeve 11a, are simultaneously achieved. Furthermore, the clutch apparatus according to the sixth embodiment differs from the clutch apparatus according to the fourth embodiment in that a stator shaft 27 is configured as a unit in which a cover 27b is press-fittedly inserted into a shaft main body 27a, instead of press-fittedly inserting the cover onto the outer circumferential surface of the shaft main body. Other configurations of the clutch apparatus according to the sixth embodiment are similar to the clutch apparatus according to the fourth embodiment. Accordingly, only the differences between the clutch apparatus according to the fourth embodiment and the clutch apparatus according to the sixth embodiment will be described below.

The shaft main body 27a includes a stepped portion at an inner circumferential surface thereof. A groove portion 27f (the internal hydraulic passage, the first hydraulic passage) is formed on a portion of the inner circumferential surface of the shaft main body 27a extending towards the transmission apparatus 3 from the stepped portion. The cover 27b for covering the entire groove portion 27f is press-fittedly inserted into the shaft main body 27a so as to be fluid-tightly fitted and fixed on the inner circumferential surface of the shaft main body 27a. The shaft main body 27a includes another stepped portion at an outer circumferential surface thereof at a position closer to the engine 1 (at the left in FIGS. 14 and 15) relative to the hydraulic passage 11b of the sleeve 11a. Furthermore, the shaft main body 27a includes a first elongated bore portion 27g (the internal hydraulic passage, the first internal hydraulic passage), which extends from a side wall surface of the stepped portion formed on the outer circumferential surface of the shaft main body 27a and facing the engine 1 to the groove portion 27f, so that the first elongated bore portion 27g is in communication with the groove portion 27f. More specifically, the first elongated bore portion 27g (the first hydraulic passage) is formed on the shaft main body 27a by means of a drill or the like so as to extend from the side wall surface of the stepped portion to the groove portion 27f. A ball member 27h is press-fittedly inserted and fixed on the first elongated bore portion 27g in a fluid-tight manner at a position closer to the engine 1 (to the left in FIGS. 14 and 15) relative to a second connecting hole portion 27i (a second bore portion) (the internal hydraulic passage, the first internal hydraulic passage). The shaft main body 27a also includes a first connecting hole portion 27e (the internal hydraulic passage, the first internal hydraulic passage), which connects the hydraulic passages 42a of the pump cover 42 and the groove portion 27f so as to establish a communication therebetween through the first connecting hole portion 27e. Furthermore, the shaft main body 27a includes the second connecting hole portion 27i, which connects the first elongated bore portion 27g and the hydraulic passage 11b of the sleeve 11a so as to establish a communication therebetween through the second connecting hole portion 27i. Each of the first connecting hole portion 27e, the groove portion 27f, the first elongated bore portion 27g and the second connecting hole portion 27i serves as a portion of the impeller clutch actuating hydraulic circuit 31 (see FIG. 14). The shaft main body 27a includes a second elongated bore portion 27k (a third bore portion) (the internal hydraulic passage, the second internal hydraulic passage) separately and independently of the first elongated bore portion 27g. More specifically, the second elongated bore portion 27k is formed at the shaft main body 27a at the different position from the first elongated bore portion 27g so as to extend from the side wall surface of the stepped portion, which is formed on the outer circumferential surface of the shaft main body 27a and which faces the engine 1, along the axial direction by means of the drill or the like. Furthermore, the second elongated bore portion 27k extends so that an inner end portion thereof is positioned closer to the transmission apparatus 3 than a second sealing member 27d. Still further, the shaft main body 27a includes a third connecting hole portion 27j (a fourth bore portion) (the internal hydraulic passage, the second internal hydraulic passage) at a position closer to the transmission apparatus 3 relative to the second sealing member 27d. The third connecting hole portion 27j (the second hydraulic passage) connects a clearance formed between the outer circumferential surface of the shaft main body 27a and the inner circumferential surface of the sleeve 11a with the second elongated bore portion 27k so as to establish a communication therebetween through the third connecting hole portion 27j. Each of a portion of the clearance (the second hydraulic passage) formed between the outer circumferential surface of the shaft main body 27a and the inner circumferential surface of the sleeve 11a extending towards the transmission apparatus 3 than the second sealing member 27d, the third connecting hole portion 27j and the second elongated bore portion 27k serves as a portion of the supply hydraulic circuit 32 (see FIG. 13). A first sealing member 27c for sealing a clearance between the shaft main body 27a and the sleeve 11a is retained at the outer circumferential portion of the shaft main body 27a at a position between the stepped portion formed on the outer circumferential surface thereof and the hydraulic passage 11b. Furthermore, the second sealing member 27d for sealing the clearance formed between the outer circumferential surface of the shaft main body 27a and the inner circumferential surface of the sleeve 11a is retained at the outer circumferential portion of the shaft main body 27a at a position closer to the transmission apparatus 3 relative to the hydraulic passage 11b of the sleeve 11a. The first and second sealing members 27c and 27d separate the impeller clutch actuating hydraulic circuit 31 and the supply hydraulic circuit 32. Other configurations of the shaft main body 27a are similar to the shaft main body 25a of the fourth embodiment (see FIGS. 10 and 11).

Figure 15:
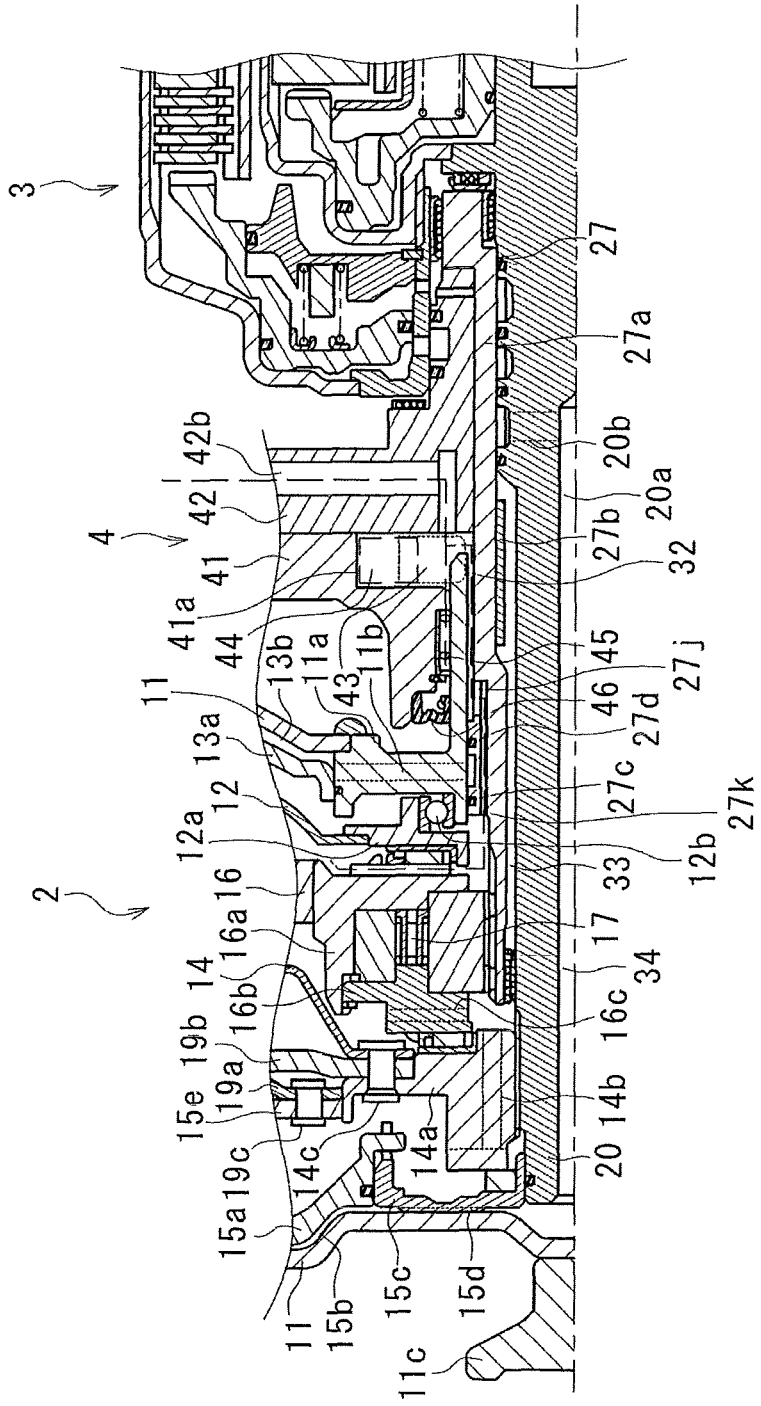
FIG. 15 is a cross-sectional diagram for explaining a supply hydraulic circuit of the clutch apparatus according to the sixth embodiment.

The cover 27b is a cylinder-shaped member for covering the entire groove portion 27f, which is formed on the inner circumferential surface of the shaft main body 27a (see FIGS. 14 and 15). The cover 27b is press-fittedly inserted into the shaft main body 27a and fitted and fixed on the inner circumferential surface of the shaft main body 27a so as to fluid-tightly cover the groove portion 27f. Furthermore, the cover 27b separates the impeller clutch actuating hydraulic circuit 31 and the supply hydraulic circuit 32. A clearance (the third hydraulic passage) formed between an inner circumferential surface of the cover 27b and the outer circumferential surface of the input shaft 20 serves as a portion of the release hydraulic circuit 33.

According to the sixth embodiment, advantages and merits similar to the fourth embodiment may be achieved.

Seventh Embodiment

Figure 16:
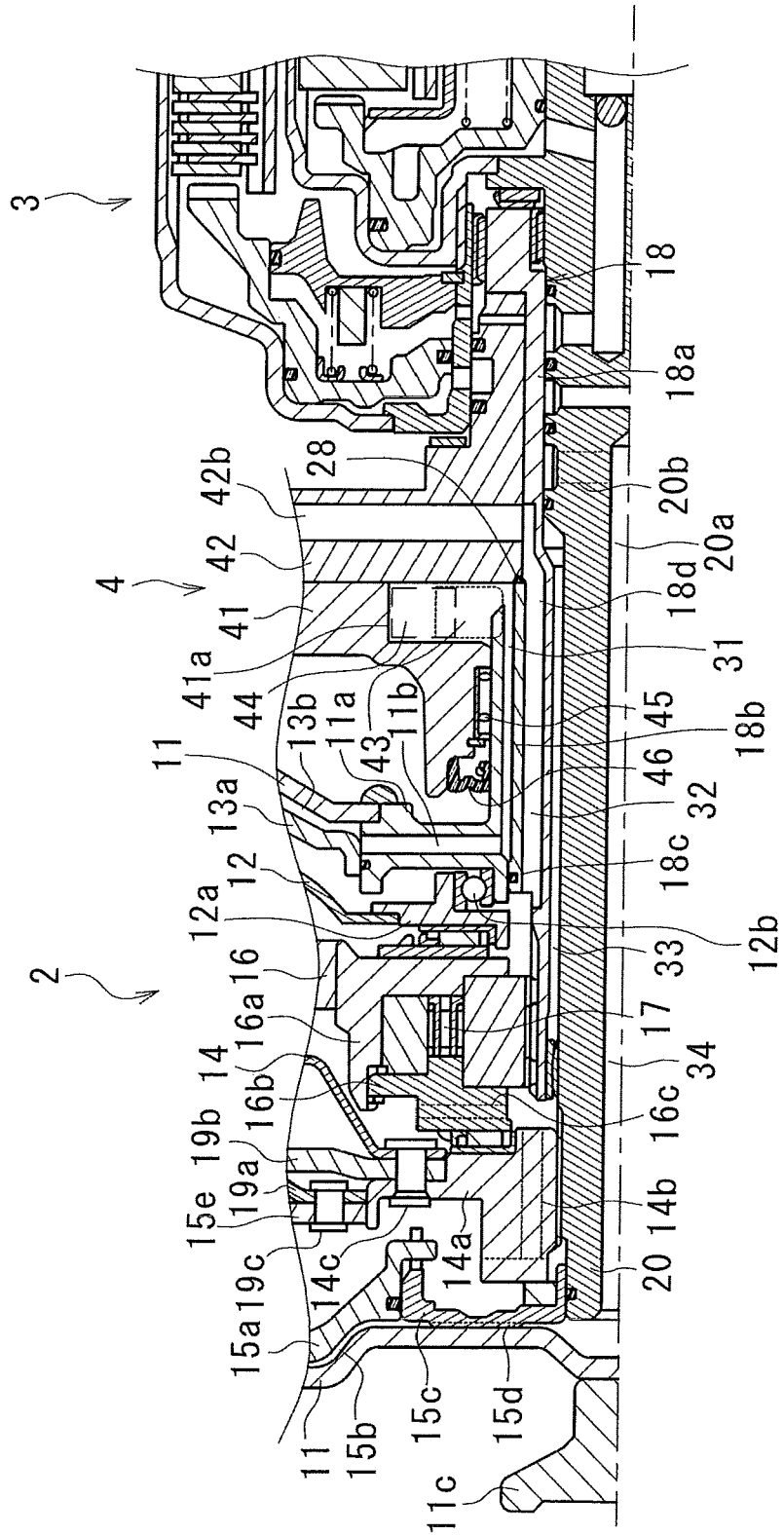
FIG. 16 is a cross-sectional diagram for explaining a sealing between a cover and a pump cover of a clutch apparatus according to a seventh embodiment.

A seventh embodiment of the clutch apparatus will be described below with reference to FIG. 16, which is a cross-sectional diagram for explaining a sealing between a cover and a pump cover of the clutch apparatus according to the seventh embodiment.

The clutch apparatus according to the seventh embodiment is a modified example of the clutch apparatus according to the first embodiment. More specifically, the clutch apparatus according to the seventh embodiment differs from the clutch apparatus according to the first embodiment in that the end portion of the cover 18b positioned closer to the transmission apparatus 3 contacts a wall surface of the pump cover 42 facing the engine 1 (to the left in FIG. 16), instead of press-fittedly inserting the end portion of the cover 18b positioned closer to the transmission apparatus 3 into the pump cover 42 so as to fluid-tightly fitted on the inner circumferential surface of the pump cover 42, and in that a sealing member 28 for sealing a clearance formed between the cover 18b and the pump cover 42 is retained by the pump cover 42. Additionally, the sealing member 28 may be retained by the cover 18b instead of the pump cover 42. Other configurations of the clutch apparatus according to the seventh embodiment are similar to the clutch apparatus according to the first embodiment. Additionally, a configuration of the clutch apparatus in which the clearance formed between the cover and the pump cover is sealed by the sealing member 28 may be adapted to the clutch apparatus according to the fourth embodiment.

According to the seventh embodiment, advantages and merits similar to the first embodiment may be achieved.

Eighth Embodiment

Figure 17:
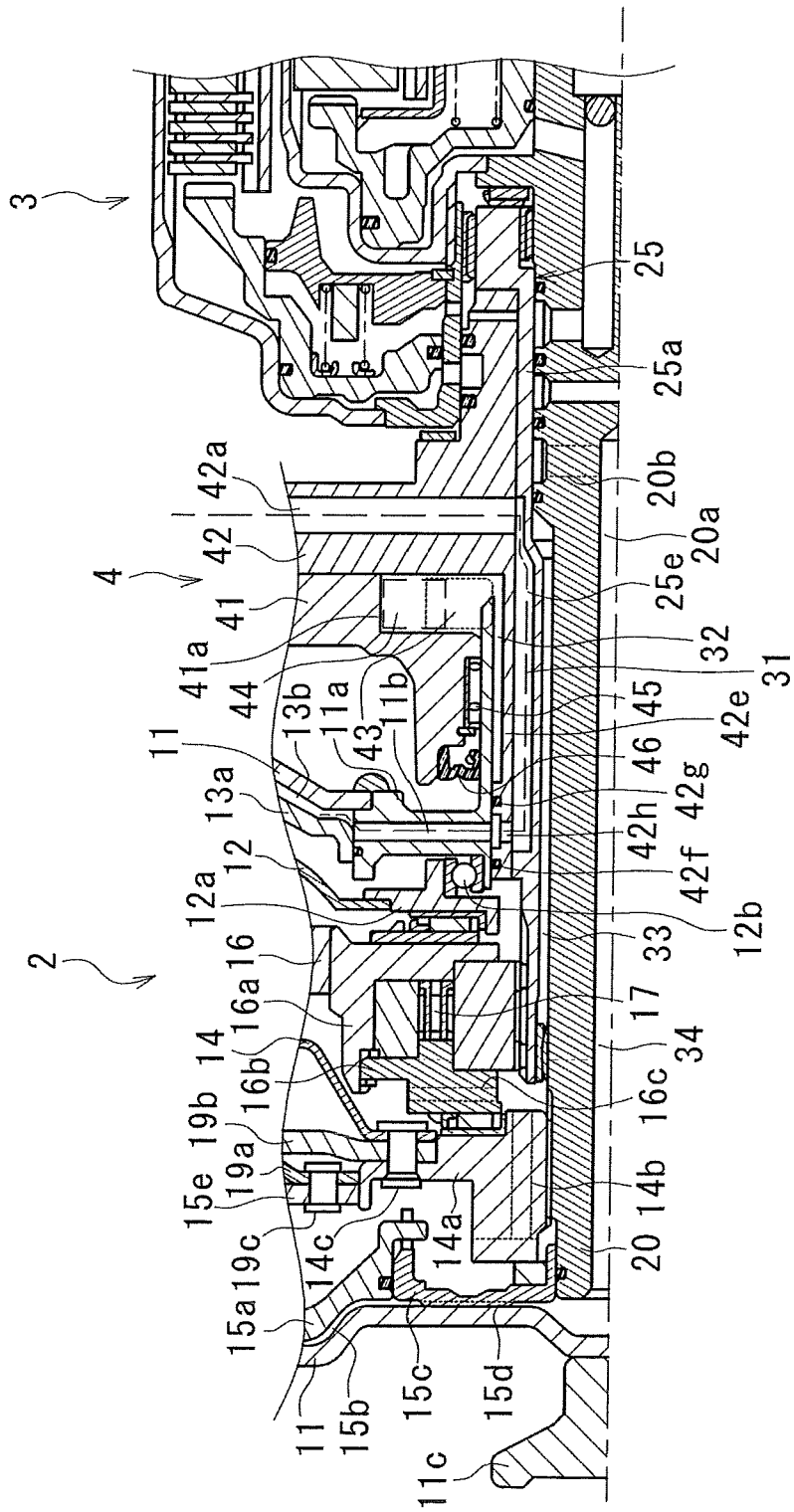
FIG. 17 is a cross-sectional diagram for explaining an impeller clutch actuating hydraulic circuit of a clutch apparatus according to an eighth embodiment.
Figure 18:
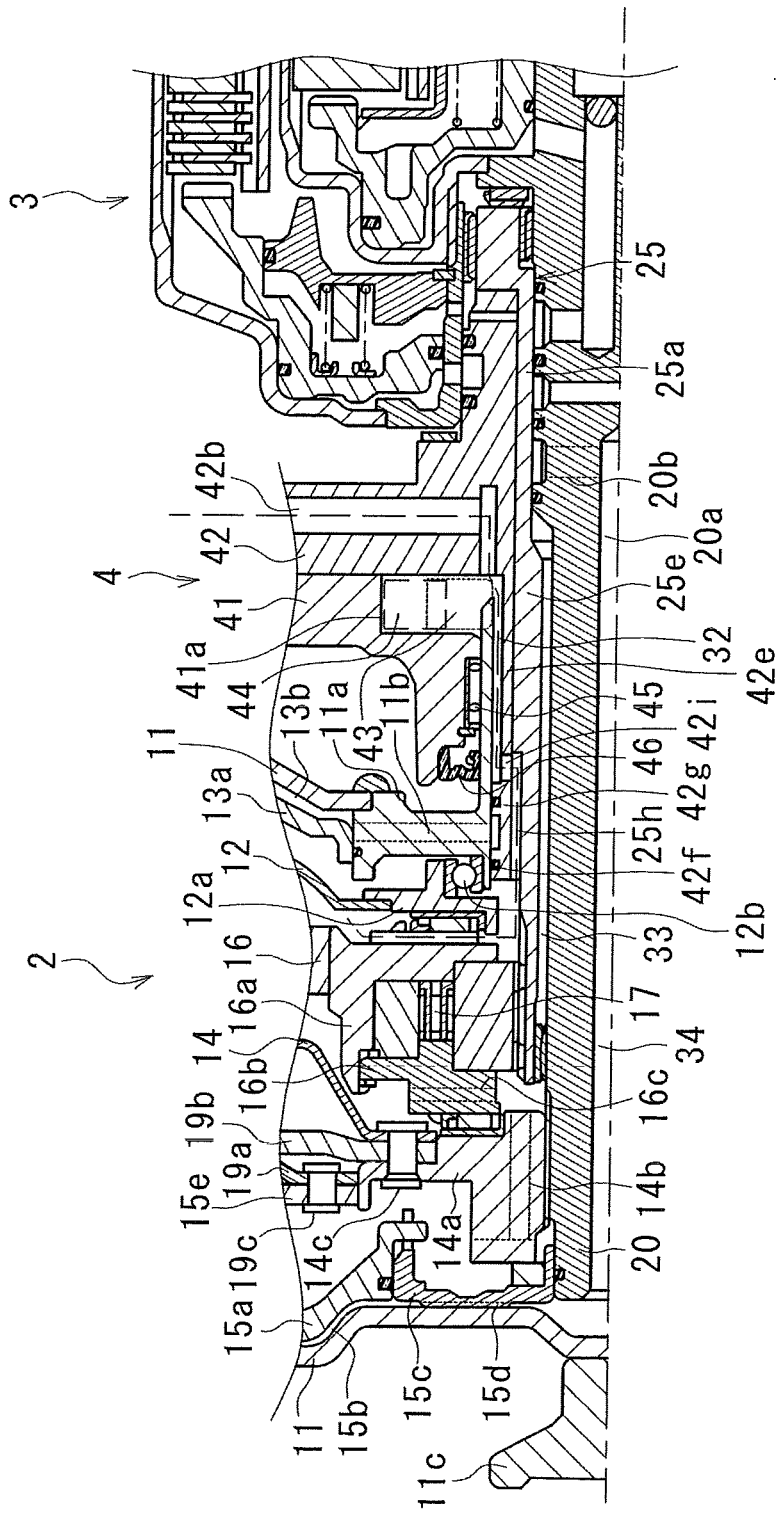
FIG. 18 is a cross-sectional diagram for explaining a supply hydraulic circuit of the clutch apparatus according to the eighth embodiment.

An eighth embodiment of the clutch apparatus will be described below with reference to the attached drawings. Illustrated in FIG. 17 is a cross-sectional diagram for explaining an impeller clutch actuating hydraulic circuit of the clutch apparatus according to the eighth embodiment. Illustrated in FIG. 18 is a cross-sectional diagram for explaining a supply hydraulic circuit of the clutch apparatus according to the eighth embodiment.

The clutch apparatus according to the eighth embodiment is a modified example of the clutch apparatus according to the fourth embodiment. More specifically, the clutch apparatus according to the eighth embodiment differs from the clutch apparatus according to the fourth embodiment in that a portion corresponding to the cover 18b (see FIG. 10) and a portion corresponding to the pump cover 42 (see FIG. 10) are integrally formed. Other configurations of the clutch apparatus according to the eighth embodiment are similar to the clutch apparatus according to the fourth embodiment. Therefore, only the differences between the clutch apparatus according to the fourth embodiment and the clutch apparatus according to the eighth embodiment will be described below. Additionally, the configuration in which the cover and the pump cover are integrally formed may be adapted to the clutch apparatus according to the first embodiment.

The pump cover 42 covers the opening of the pump chamber 41a opening towards the transmission apparatus 3. The pump cover 42 includes a cover portion 42e, which is formed in a cylindrical shape and which extends from a radially inner circumferential portion of the pump cover 42 towards the torque converter 2 along the axial direction. A portion of the shaft main body 25a of the stator shaft 25 is press-fittedly inserted into the pump cover 42 and is fluid-tightly fitted and fixed on an inner circumferential surface of the pump cover 42 including an inner circumferential surface of the pump portion 42e. Furthermore, the pump cover 42 includes the hydraulic passage 42a, which is connected to the first groove portion 25e of the stator shaft 25 so as to be in communication therewith (see FIG. 17). The hydraulic passage 42a serves as a portion of the impeller clutch actuating hydraulic circuit 31. Still further, the pump cover 42 includes the hydraulic passage 42b, which is connected to a clearance formed between the inner circumferential surface of the sleeve 11a and an outer circumferential surface of the cover portion 42e so as to be in communication therewith (see FIG. 18). The hydraulic passage 42b serves as a portion of the supply hydraulic circuit 32.

The cover portion 42e is a cylinder-shaped portion that covers the first and second groove portions 25e and 25h, which are formed on the outer circumferential portion of the shaft main body 25a at different positions. More specifically, the cover portion 42e is press-fittedly inserted onto the shaft main body 25a so as to fluid-tightly seal the first and second groove portions 25e and 25h. Accordingly, the cover portion 42e separates the impeller clutch actuating hydraulic circuit 31 and the supply hydraulic circuit 32 (i.e. the cover portion 42e separates the clearance formed between the inner circumferential surface of the sleeve 11a and the outer circumferential surface of the shaft main body 25a into the impeller clutch actuating hydraulic circuit 31 and the supply hydraulic circuit 32). An end portion of the cover portion 42e positioned closer to the transmission apparatus 3 is integrally connected to a main body portion of the pump cover 42. A sealing member 42f for sealing a clearance formed between the cover portion 42e and the sleeve 11a is retained at the outer circumferential surface of the cover portion 42e in the vicinity of an end portion thereof closer to the engine 1 (at the left in FIGS. 17 and 18). Furthermore, a second sealing member 42g for sealing the clearance formed between the outer circumferential surface of the cover portion 42e and the inner circumferential surface of the sleeve 11a is retained at the outer circumferential surface of the cover portion 42e at a position closer to the transmission apparatus 3 relative to the hydraulic passage 11b of the sleeve 11a. The first and second sealing members 42f and 42g separate the impeller clutch actuating hydraulic circuit 31 and the supply hydraulic circuit 32. The cover portion 42e includes a first connecting hole portion 42h (the internal hydraulic passage, the first internal hydraulic passage), which connects a clearance (the first hydraulic passage) formed between the inner circumferential surface of the cover portion 42e and the first groove portion 25e of the shaft main body 25a with the hydraulic passage 11b of the sleeve 11a so as to establish a communication therebetween through the first connecting hole portion 42h (the first hydraulic passage) (see FIG. 17). Each of the clearance formed between the inner circumferential surface of the cover portion 42e and the first groove portion 25e of the shaft main body 25a, and the first connecting hole portion 42h serves as a portion of the impeller clutch actuating hydraulic circuit 31. Still further, the cover portion 42e includes a second connecting hole portion 42i (an internal hydraulic passage, the second internal hydraulic passage), which connects a portion of the clearance (the second hydraulic passage) formed between the outer circumferential surface of the cover portion 42e and the inner circumferential surface of the sleeve 11a positioned closer to the transmission apparatus 3 relative to the second sealing member 42g with the clearance (the second hydraulic passage) formed between the inner circumferential surface of the cover portion 42e and the second groove portion 25h of the shaft main body 25a so as to establish a communication therebetween through the second connecting hole portion 42i (the second hydraulic passage) (see FIG. 18). Each of the portion of the clearance formed between the outer circumferential surface of the cover portion 42e and the inner circumferential surface of the sleeve 11a positioned closer to the transmission apparatus 3 relative to the second sealing member 42g, the second connecting hole portion 42i, and the clearance formed between the inner circumferential surface of the cover portion 42e and the second groove portion 25h of the shaft main body 25a serves as a portion of the supply hydraulic circuit 32.

According to the eighth embodiment, advantages and merits similar to the fourth embodiment may be achieved. Furthermore, because the cover portion 42b is integrally provided at the pump cover 42, a number of components may be further reduced and manufacturing costs of the clutch apparatus may be further reduced.

Accordingly, because the internal hydraulic passage(s) (18d, 22b, 22c, 24d, 24e, 24f, 25g, 25h, 26g, 26h, 27j, 27k), which serves as a portion of the supply hydraulic circuit 32 is formed at the stator shaft (18, 22, 24, 25, 26, 27), the clutch apparatus having four hydraulic circuits may be achieved without changing the shape of the input shaft 20, which is also adapted to a known clutch apparatus having three hydraulic circuits. As a result, the clutch apparatus having four hydraulic circuits may be achieved at lower manufacturing costs when comparing to a known clutch apparatus having four hydraulic circuits. Furthermore, because the supply hydraulic circuit 32 does not include the hydraulic passage(s) formed at the input shaft 20, the increase of the input shaft 20 in the radial direction and in the axial direction may be avoided.

According to the embodiments, the clutch apparatus is configured as the torque converter 2 having the pump impeller 12, to which the rotational force of the engine 1 is inputted, the turbine runner 14, which receives the rotational force outputted from the pump impeller 12 via the oil and transmits the rotational force to the input shaft 20, the stator 16, which is provided between the pump impeller 12 and the turbine runner 14 so as to be positioned radially inwardly of the pump impeller 12 and the turbine runner 14 and which is connectable to the stator shaft (18, 22, 24, 25, 26, 27) via the one-way clutch 17, the impeller clutch 13, which is configured so as to establish and interrupt the rotational force transmission from the engine 1 to the pump impeller 12, and the lock-up clutch 15, which is configured so as to establish and interrupt the rotational force transmission from the engine 1 to the turbine runner 14. The first hydraulic passage serves as a portion of the impeller clutch actuating hydraulic circuit 31 through which the oil is supplied in order to actuate the impeller clutch 13. The second hydraulic passage serves as a portion of the supply hydraulic circuit 32 through which the oil is supplied between the pump impeller 12 and the turbine runner 14. The third hydraulic passage serves as a portion of the release hydraulic circuit 33 through which the oil between the pump impeller 12 and the turbine runner 14 is discharged. The fourth hydraulic passage serves as a portion of the lock-up clutch actuating hydraulic circuit 34 through which the oil is supplied in order to actuate the lock-up clutch 15.

According to the first, fourth and seventh embodiments, the stator shaft (18, 25) is configured as the unit in which the cover (18b, 25b), which is formed in the cylindrical shape, is closely fitted and fixed on the outer circumferential surface of the shaft main body (18a, 25a). The shaft main body (18a, 25a) includes the groove portion (18d, 25e, 25h) at a portion of the outer circumferential surface. The cover (18b, 25b) is provided on the outer circumferential surface of the shaft main body (18a, 25a) so as to cover the groove portion (18d, 25e, 25h) except for an end portion thereof. Furthermore, the internal hydraulic passage includes the clearance formed between the groove portion (18d, 25e, 25f) of the shaft main body (18a, 25a) and the cover (18b, 25b).

According to the embodiments, a portion of the shaft main body (18a, 25a) and a portion of the cover (18b, 25b) are closely fitted and fixed onto the inner circumferential surface of the pump cover 42, which is provided between the clutch apparatus configured as the torque converter 2 and the transmission apparatus 3.

According to the seventh embodiment, a portion of the shaft main body 18a is closely fitted and fixed onto the inner circumferential surface of the pump cover 42, which is provided between the clutch apparatus configured as the torque converter 2 and the transmission apparatus 3. The sealing member 28 is provided between the end portion of the cover 18b and the pump cover 42.

According to the embodiment, the clutch apparatus further includes the pump cover 42, which is provided between the clutch apparatus configured as the torque converter 2 and the transmission apparatus 3, wherein the pump cover 42 integrally includes the cover portion 42e.

According to the embodiments, the internal hydraulic passage (22c, 24f, 26d, 26h, 27g, 27k) is formed by forming a bore on the stator shaft (22, 24, 26, 27) by means of the drill or the like.

According to the third and sixth embodiments, the stator shaft (24, 27) is configured as the unit in which the cover (24b, 27b), which is formed in the cylindrical shape, is closely fitted and fixed on the inner circumferential surface of the shaft main body (24a, 27a). The shaft main body (24a, 27a) includes the groove portion (24e, 27f) at a portion of the inner circumferential surface and the bore portion (24f, 27g: the first bore portions 24f, 27g) at the inside of the shaft main body (24a, 27a). The groove portion (24e, 27f) is connected to the bore portion (24f, 27g) so as to establish the communication therebetween. The cover (24b, 27b) is provided on the inner circumferential surface of the shaft main body (24a, 27a) so as to cover the entire groove portion (24e, 27f). The internal hydraulic passage includes the clearance formed between the groove portion (24e, 27f), the cover (24b, 27b), and the bore portion (24f, 27g) of the shaft main body (24a, 27a).

According to the embodiments, the clutch apparatus further includes the sealing member (18c, 22a, 24c, 25a, 25d, 26a, 26b, 27c, 27d, 42f, 42g) for separating the first hydraulic passage (31, 32) and the second hydraulic passage (32, 31) in a manner where the sealing member (18c, 22a, 24c, 25a, 25d, 26a, 26b, 27c, 27d, 42f, 42g) seals the clearance formed between the stator shaft (18, 22, 24, 25, 26, 27) and the sleeve (11a).

According to the fourth, sixth and eighth embodiments, the internal hydraulic passage of the stator shaft (25, 27) includes the first internal hydraulic passage (25e, 25f, 27e, 27f, 27g, 27i, 42h) and the second internal hydraulic passage (25g, 25h, 27j, 27k, 42i), which are separated and independent from each other. The second internal hydraulic passage (25g, 25h, 27j, 27k, 42i) is connected to the clearance formed between the inner circumferential surface of the sleeve (11a) and the outer circumferential surface of the stator shaft (25, 27) so as to establish a communication therewith. The first hydraulic passage includes the clearance formed between the inner circumferential surface of the sleeve (11a) and the outer circumferential surface of the stator shaft (25, 27), and the second internal hydraulic passage (25g, 25h, 27j, 27k, 42i).

According to the fourth, sixth and eighth embodiments, the clutch apparatus includes the pump impeller 12, into which the rotational force of the engine 1 is inputted, the turbine runner 14, which receives the rotational force from the pump impeller 12 via an oil and transmits the rotational force to the input shaft 20, the stator, which is provided between the pump impeller 12 and the turbine runner 14 so as to be positioned radially inwardly of the pump impeller 12 and the turbine runner 14 and which is connectable to the stator shaft (25, 27)

via the one-way clutch 17, the impeller clutch 13, which is configured so as to establish and interrupt the rotational force transmission from the engine 1 to the pump impeller 12, and the lock-up clutch 15, which is configured so as to establish and interrupt the rotational force transmission from the engine 1 to the turbine runner 14. The first hydraulic passage serves as a portion of the supply hydraulic circuit 32 through which the oil is supplied between the pump impeller 12 and the turbine runner 14. The second hydraulic passage serves as a portion of the impeller clutch actuating hydraulic circuit 31 through which the oil is supplied in order to actuate the impeller clutch 13. The third hydraulic passage serves as a portion of the release hydraulic circuit 33 through which the oil between the pump impeller 12 and the turbine runner 14 is discharged. The fourth hydraulic passage serves as a portion of the lock-up clutch actuating hydraulic circuit 34 through which the oil is supplied in order to actuate the lock-up clutch 15.

According to the fourth embodiment, the stator shaft 25 is configured as the unit in which the cover 25b, which is formed in the cylindrical shape, is closely fitted and fixed on the outer circumferential surface of the shaft main body 25a. The shaft main body 25a includes the first groove portion 25e and the second groove portion 25h, which are formed on the outer circumferential surface of the shaft main body 25a at the different positions so as to be separately and independently of each other. The cover 25b is provided on the outer circumferential surface of the shaft main body 25a so as to cover a portion of the first groove portion 25e and a portion of the second groove portion 25h. Furthermore, the cover 25b includes the first connecting hole portion 25f, which connects the first groove portion 25e and the impeller clutch 13 so as to establish the communication therebetween through the first connecting hole portion 25f, and the second connecting hole portion 25g, which connects the second groove portion 25h and the clearance formed between the inner circumferential surface of the sleeve 11a and the outer circumferential surface of the stator shaft 25 so as to establish the communication therebetween through the second connecting hole portion 25g. The first internal hydraulic passage includes the clearance formed between the first groove portion 25e and the cover 25b and the the first connecting hole portion 25f. The second hydraulic passage includes the second connecting hole portion 25g and the clearance formed between the second groove portion 25h and the cover 25b.

According to the fourth embodiment, a portion of the shaft main body 25a and a portion of the cover 25b are closely fitted and fixed onto the inner circumferential surface of the pump cover 42, which is provided between the clutch apparatus, which is configured as the torque converter 2, and a transmission apparatus 3.

According to the seventh embodiment, a portion of the shaft main body 18a is closely fitted and fixed on the inner circumferential surface of the pump cover 42, which is provided between the clutch apparatus, which is configured as the torque converter 2, and the transmission apparatus 3. The sealing member 28 is provided between the end portion of the cover 18b and the pump cover 42.

According to the eighth embodiment, the clutch apparatus further includes the pump cover 42, which is provided between the torque converter 2 and the transmission apparatus 3. The pump cover 42 integrally includes the cover portion 42e.

According to the sixth embodiment, each of the first internal hydraulic passage (27e, 27f, 27g) and the second internal hydraulic passage (27j, 27k) is formed on the stator shaft (27) by forming a bore by means of the drill or the like. The ball member 27f is press-fittedly inserted and fixed on the first internal hydraulic passage (27e, 27f, 27g) thereby separating the first hydraulic passage and the second hydraulic passage.

According to the sixth embodiment, the stator shaft 27 is configured as the unit in which the cover 27b, which is formed in the cylindrical shape, is closely fitted and fixed on the inner circumferential surface of the shaft main body 27. The shaft main body 27a includes the groove portion 27f at the portion of an inner circumferential surface of the shaft main body 27a, the first elongated bore portion 27g formed at the inner portion of the shaft main body 27a and connected to the groove portion 27f, the first connecting hole portion 27i formed at the inner portion of the shaft main body 27a and connecting the first elongated bore portion 27g and the impeller clutch 13 so as to establish the communication therebetween, the second elongated bore portion 27k formed at the inner portion of the shaft main body 27a separately and independently of the first elongated bore portion 27g, and the second connecting hole portion 27j formed at the inner portion of the shaft main body 27a and connecting the clearance formed between the shaft main body 27a and the sleeve 11a and the second elongated bore portion 27k so as to establish the communication therebetween through the second connecting hole portion 27j. The cover 27b is provided on the inner circumferential surface of the shaft main body 27a so as to cover the entire groove portion 27f. The first internal hydraulic passage includes the clearance formed between the groove portion 27f and the cover 27b, the first elongated bore portion 27g and the first connecting hole portion 27i. The second internal hydraulic passage includes the second elongated bore portion 27k and the second connecting hole portion 27j. The ball member 27h is press-fittedly inserted and fixed on the first elongated bore portion 27g thereby separating the first hydraulic passage and the second hydraulic passage.

According to the fourth, sixth and eighth embodiments, the clutch apparatus further includes the first sealing member (25c, 27c, 42f) and the second sealing member (25d, 27d, 42g) for sealing the clearance formed between the stator shaft (25, 27) and the sleeve (11a) thereby separating the first hydraulic passage and the second hydraulic passage.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:
1. A clutch apparatus comprising:
an input shaft having a bore portion so as to extend from an end portion of the input shaft in an axial direction thereof;
a stator shaft formed in a cylindrical shape and provided so as to surround an outer circumferential surface of the input shaft; and
a sleeve formed in a cylindrical shape and provided so as to surround an outer circumferential surface of the stator shaft, wherein
the stator shaft includes an internal hydraulic passage, a clearance formed between an inner circumferential surface of the sleeve and the outer circumferential surface of the stator shaft serves as a first hydraulic passage, the internal hydraulic passage serves as a second hydraulic passage, a clearance formed between an inner circumferential surface of the stator shaft and the outer circumferential surface of the input shaft serves as a third hydraulic passage, the bore portion formed at the input shaft serves as a fourth hydraulic passage, and wherein the clutch apparatus is configured as a torque converter having a pump impeller, to which a rotational force of an internal combustion engine is inputted, a turbine runner, which receives the rotational force outputted from the pump impeller via an oil and transmits the rotational force to the input shaft, a stator, which is provided between the pump impeller and the turbine runner so as to be positioned radially inwardly of the pump impeller and the turbine runner and which is connectable to the stator shaft via a one-way clutch, an impeller clutch, which is configured so as to establish and interrupt a rotational force transmission from the internal combustion engine to the pump impeller, and a lock-up clutch, which is configured so as to establish and interrupt a rotational force transmission from the internal combustion engine to the turbine runner, and wherein the first hydraulic passage serves as a portion of an impeller clutch actuating hydraulic circuit through which the oil is supplied in order to actuate the impeller clutch, the second hydraulic passage serves as a portion of a supply hydraulic circuit through which the oil is supplied between the pump impeller and the turbine runner, the third hydraulic passage serves as a portion of a release hydraulic circuit through which the oil between the pump impeller and the turbine runner is discharged, and the fourth hydraulic passage serves as a portion of a lock-up clutch actuating hydraulic circuit through which the oil is supplied in order to actuate the lock-up clutch.

2. The clutch apparatus according to claim 1, wherein the stator shaft is configured as a unit in which a cover, which is formed in a cylindrical shape, is closely fitted and fixed on an outer circumferential surface of a shaft main body, the shaft main body includes a groove portion at a portion of the outer circumferential surface, the cover is provided on the outer circumferential surface of the shaft main body so as to cover the groove portion except for an end portion thereof, and the internal hydraulic passage includes a clearance formed between the groove portion of the shaft main body and the cover.

3. The clutch apparatus according to claim 2, wherein a portion of the shaft main body and a portion of the cover are closely fitted and fixed onto an inner circumferential surface of a pump cover, which is provided between the clutch apparatus and a transmission apparatus.

4. The clutch apparatus according to claim 2, wherein a portion of the shaft main body is closely fitted and fixed onto an inner circumferential surface of a pump cover, which is provided between the clutch apparatus configured as a torque converter and a transmission apparatus, and a sealing member is provided between an end portion of the cover and the pump cover.

5. The clutch apparatus according to claim 1, wherein the internal hydraulic passage is formed by forming a bore on the stator shaft by means of a drill.

6. The clutch apparatus according to claim 1, wherein the stator shaft is configured as a unit in which a cover, which is formed in a cylindrical shape, is closely fitted and fixed on an inner circumferential surface of a shaft main body, the shaft main body includes a groove portion at a portion of the inner circumferential surface and a bore portion at an inside of the shaft main body, the groove portion is connected to the bore portion so as to establish a communication therebetween, the cover is provided on the inner circumferential surface of the shaft main body so as to cover the entire groove portion, and the internal hydraulic passage includes a clearance formed between the groove portion and the cover, and the bore portion of the shaft main body.

7. The clutch apparatus according to claim 1, further comprising a sealing member for separating the first hydraulic passage and the second hydraulic passage in a manner where the sealing member seals a clearance formed between the stator shaft and the sleeve.

8. A clutch apparatus comprising:

an input shaft having a bore portion so as to extend from an end portion of the input shaft in an axial direction thereof;

a stator shaft formed in a cylindrical shape and provided so as to surround an outer circumferential surface of the input shaft; and a sleeve formed in a cylindrical shape and provided so as to surround an outer circumferential surface of the stator shaft, wherein the stator shaft includes an internal hydraulic passage, a clearance formed between an inner circumferential surface of the sleeve and the outer circumferential surface of the stator shaft serves as a first hydraulic passage, the internal hydraulic passage serves as a second hydraulic passage, a clearance formed between an inner circumferential surface of the stator shaft and the outer circumferential surface of the input shaft serves as a third hydraulic passage, the bore portion formed at the input shaft serves as a fourth hydraulic passage, and wherein the stator shaft is configured as a unit in which a cover, which is formed in a cylindrical shape, is closely fitted and fixed on an outer circumferential surface of a shaft main body, the shaft main body includes a groove portion at a portion of the outer circumferential surface, the cover is provided on the outer circumferential surface of the shaft main body so as to cover the groove portion except for an end portion thereof, and the internal hydraulic passage includes a clearance formed between the groove portion of the shaft main body and the cover.

9. The clutch apparatus according to claim 8, further comprising a pump cover, which is provided between the clutch apparatus configured as a torque converter and a transmission apparatus, wherein the pump cover integrally includes the cover.

10. A clutch apparatus comprising:

an input shaft having a bore portion so as to extend from an end portion of the input shaft in an axial direction thereof;

a stator shaft formed in a cylindrical shape and provided so as to surround an outer circumferential surface of the input shaft; and a sleeve formed in a cylindrical shape and provided so as to surround an outer circumferential surface of the stator shaft, wherein the stator shaft includes an internal hydraulic passage, a clearance formed between an inner circumferential surface of the sleeve and the outer circumferential surface of the stator shaft serves as a first hydraulic passage, the internal hydraulic passage serves as a second hydraulic passage, a clearance formed between an inner circumferential surface of the stator shaft and the outer circumferential surface of the input shaft serves as a third hydraulic passage, the bore portion formed at the input shaft serves as a fourth hydraulic passage, and wherein the internal hydraulic passage of the stator shaft includes a first internal hydraulic passage and a second internal hydraulic passage, which are separated and independent from each other, the second internal hydraulic passage is connected to the clearance formed between the inner circumferential surface of the sleeve and the outer circumferential surface of the stator shaft so as to establish a communication therewith, and the first hydraulic passage includes the clearance formed between the inner circumferential surface of the sleeve and the outer circumferential surface of the stator shaft, and the second internal hydraulic passage.

11. The clutch apparatus according to claim 10, wherein the clutch apparatus includes a pump impeller, into which a rotational force of an internal combustion engine is inputted, a turbine runner, which receives the rotational force from the pump impeller via an oil and transmits the rotational force to the input shaft, a stator, which is provided between the pump impeller and the turbine runner so as to be positioned radially inwardly of the pump impeller and the turbine runner and which is connectable to the stator shaft via a one-way clutch, an impeller clutch, which is configured so as to establish and interrupt a rotational force transmission from the internal combustion engine to the pump impeller, and a lock-up clutch, which is configured so as to establish and interrupt a rotational force transmission from the internal combustion engine to the turbine runner, and wherein the first hydraulic passage serves as a portion of a supply hydraulic circuit through which the oil is supplied between the pump impeller and the turbine runner, the second hydraulic passage serves as a portion of an impeller clutch actuating hydraulic circuit through which the oil is supplied in order to actuate the impeller clutch, the third hydraulic passage serves as a portion of a release hydraulic circuit through which the oil between the pump impeller and the turbine runner is discharged, and the fourth hydraulic passage serves as a portion of a lock-up clutch actuating hydraulic circuit through which the oil is supplied in order to actuate the lock-up clutch.

12. The clutch apparatus according to claim 10, wherein the stator shaft is configured as a unit in which a cover, which is formed in a cylindrical shape, is closely fitted and fixed on an outer circumferential surface of a shaft main body, the shaft main body includes a first groove portion and a second groove portion, which are formed on the outer circumferential surface of the shaft main body at different positions so as to be separately and independently of each other, the cover is provided on the outer circumferential surface of the shaft main body so as to cover a portion of the first groove portion and a portion of the second groove portion, the cover includes a first bore portion, which connects the first groove portion and the impeller clutch so as to establish a communication therebetween through the first bore portion, and a second bore portion, which connects the second groove portion and the clearance formed between the inner circumferential surface of the sleeve and the outer circumferential surface of the stator shaft so as to establish a communication therebetween through the second bore portion, the first internal hydraulic passage includes a clearance formed between the first groove portion and the cover and the first bore portion, and wherein the second hydraulic passage includes the second bore portion and a clearance formed between the second groove portion and the cover.

13. The clutch apparatus according to claim 12, wherein a portion of the shaft main body and a portion of the cover are closely fitted and fixed onto an inner circumferential surface of a pump cover, which is provided between the clutch apparatus, which is configured as a torque converter, and a transmission apparatus.

14. The clutch apparatus according to claim 12, wherein a portion of the shaft main body is closely fitted and fixed on an inner circumferential surface of a pump cover, which is provided between the clutch apparatus, which is configured as a torque converter, and a transmission apparatus, and a sealing member is provided between an end portion of the cover and the pump cover.

15. The clutch apparatus according to claim 12, further comprising a pump cover, which is provided between the torque converter and a transmission apparatus, wherein the pump cover integrally includes a cover.

16. The clutch apparatus according to claim 10, wherein each of the first internal hydraulic passage and the second internal hydraulic passage is formed on the stator shaft by forming a bore by means of a drill, and a ball member is press-fittedly inserted and fixed on the first internal hydraulic passage thereby separating the first hydraulic passage and the second hydraulic passage.

17. The clutch apparatus according to claim 10, wherein the stator shaft is configured as a unit in which a cover, which is formed in a cylindrical shape, is closely fitted and fixed on an inner circumferential surface of a shaft main body, the shaft main body includes a groove portion at a portion of an inner circumferential surface of the shaft main body, a first bore portion formed at an inner portion of the shaft main body and connected to the groove portion, a second bore portion formed at the inner portion of the shaft main body and connecting the first bore portion and an impeller clutch so as to establish a communication therebetween, a third bore portion formed at the inner portion of the shaft main body separately and independently of the first bore portion, and a fourth bore portion formed at the inner portion of the shaft main body and connecting the clearance formed between the shaft main body and the sleeve and the third bore portion so as to establish a communication therebetween through the fourth bore portion, and wherein the cover is provided on the inner circumferential surface of the shaft main body so as to cover the entire groove portion, the first internal hydraulic passage includes a clearance formed between the groove portion and the cover, the first bore portion and the second bore portion, the second internal hydraulic passage includes the third bore portion and the fourth bore portion, and a ball member is press-fittedly inserted and fixed on the first bore portion thereby separating the first hydraulic passage and the second hydraulic passage.

18. The clutch apparatus according to claim 10, further comprising a first sealing member and a second sealing member for sealing a clearance formed between the stator shaft and the sleeve thereby separating the first hydraulic passage and the second hydraulic passage.

19. A clutch apparatus comprising:
an input shaft having a bore portion;
a stator shaft formed in a cylindrical shape and provided so as to surround an outer circumferential surface of the input shaft; and a sleeve formed in a cylindrical shape and provided so as to surround an outer circumferential surface of the stator shaft, wherein the stator shaft includes a passage at an inside thereof through which an oil flows, a clearance formed between an inner circumferential surface of the sleeve and the outer circumferential surface of the stator shaft serves as a first hydraulic passage, the passage formed at the inside of the stator shaft serves as a second hydraulic passage, a clearance formed between an inner circumferential surface of the stator shaft and the outer circumferential surface of the input shaft serves as a third hydraulic passage, the bore portion formed at an inside of the input shaft serves as a fourth hydraulic passage, and wherein the clutch apparatus is configured as a torque converter having a pump impeller, to which a rotational force of an internal combustion engine is inputted, a turbine runner, which receives the rotational force outputted from the pump impeller via an oil and transmits the rotational force to the input shaft, a stator, which is provided between the pump impeller and the turbine runner so as to be positioned radially inwardly of the pump impeller and the turbine runner and which is connectable to the stator shaft via a one-way clutch, an impeller clutch, which is configured so as to establish and interrupt a rotational force transmission from the internal combustion engine to the pump impeller, and a lock-up clutch, which is configured so as to establish and interrupt a rotational force transmission from the internal combustion engine to the turbine runner, and wherein the first hydraulic passage serves as a portion of an impeller clutch actuating hydraulic circuit through which the oil is supplied in order to actuate the impeller clutch, the second hydraulic passage serves as a portion of a supply hydraulic circuit through which the oil is supplied between the pump impeller and the turbine runner, the third hydraulic passage serves as a portion of a release hydraulic circuit through which the oil between the pump impeller and the turbine runner is discharged, and the fourth hydraulic passage serves as a portion of a lock-up clutch actuating hydraulic circuit through which the oil is supplied in order to actuate the lock-up clutch.

* * * * *